US011978067B2

(12) United States Patent
Mai et al.

(10) Patent No.: US 11,978,067 B2
(45) Date of Patent: May 7, 2024

(54) DETERMINING PATTERNS WITHIN A STRING SEQUENCE OF USER ACTIONS

(71) Applicant: Adobe Inc., San Jose, CA (US)

(72) Inventors: Tung Mai, San Jose, CA (US); Iftikhar Ahamath Burhanuddin, Bangalore (IN); Georgios Theocharous, San Jose, CA (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/096,255

(22) Filed: Nov. 12, 2020

(65) Prior Publication Data

US 2022/0148015 A1    May 12, 2022

(51) Int. Cl.
    G06Q 30/0201    (2023.01)
    G06F 3/14    (2006.01)
    G06F 7/08    (2006.01)
    G06Q 10/10    (2023.01)

(52) U.S. Cl.
    CPC .......... *G06Q 30/0201* (2013.01); *G06F 7/08* (2013.01); *G06Q 10/10* (2013.01); *G06F 3/14* (2013.01)

(58) Field of Classification Search
    None
    See application file for complete search history.

(56) References Cited

U.S. PATENT DOCUMENTS

2008/0306948 A1* 12/2008 Uppala ............... G06F 16/2425
2014/0222503 A1*  8/2014 Vijayaraghavan .........................
                                                 G06Q 30/0201
                                                         705/7.29
2016/0063055 A1*  3/2016 Reed .................. G06F 16/90344
                                                         707/721
2018/0174070 A1*  6/2018 Hoffman ............ G06Q 30/0277
2018/0300609 A1* 10/2018 Krishnamurthy ...... G06N 3/088

(Continued)

FOREIGN PATENT DOCUMENTS

WO    WO-2019227071 A1 * 11/2019 .......... G06F 11/3024
WO    WO-2021077227 A1 *  4/2021 ......... G06Q 30/0201

OTHER PUBLICATIONS

Shi et al, Intention-based Online Consumer Classification for Recommendation and Personalization (Year: 2016).*

(Continued)

*Primary Examiner* — Mohamed N El-Bathy
(74) *Attorney, Agent, or Firm* — FINCH & MALONEY PLLC

(57) ABSTRACT

Techniques are provided for analyzing user actions that have occurred over a time period. The user actions can be, for example, with respect to the user's navigation of content or interaction with an application. Such user data is provided in an action string, which is converted into a highly searchable format. As such, the presence and frequency of particular user actions and patterns of user actions within an action string of a particular user, as well as among multiple action strings of multiple users, are determinable. Subsequences of one or more action strings are identified and both the number of action strings that include a particular subsequence and the frequency that a particular subsequence is present in a given action string are determinable. The conversion involves breaking that string into a sorted list of locations for the actions within that string. Queries can be readily applied against the sorted list.

28 Claims, 10 Drawing Sheets

(56) References Cited

U.S. PATENT DOCUMENTS

| | | | | |
|---|---|---|---|---|
| 2019/0080020 A1* | 3/2019 | Alkan | ................... | G16H 70/20 |
| 2019/0147231 A1* | 5/2019 | Kim | ..................... | G06N 3/042 |
| | | | | 382/181 |
| 2019/0205905 A1* | 7/2019 | Raghunathan | ....... | G06N 3/0454 |
| 2020/0065097 A1* | 2/2020 | Figuli | ................. | G06F 9/30036 |
| 2020/0134300 A1* | 4/2020 | Kim | .................... | G06N 3/0427 |
| 2020/0151596 A1* | 5/2020 | Horowitz | ............... | G06F 17/16 |
| 2020/0195737 A1* | 6/2020 | Phansalkar | ............. | H04L 67/22 |
| 2022/0044168 A1* | 2/2022 | Oberman | ......... | G06Q 10/06316 |

OTHER PUBLICATIONS

Xylogiannopoulos et al., Frequent and non-frequent pattern detection in big data streams: An experimental simulation in 1 trillion data points (Year: 2016).*

Roychowdhury et al., Categorizing Online Shopping Behavior from Cosmetics to Electronics: An Analytical Framework (Year: 2020).*

Wu et al., Speaking with Actions—Learning Customer Journey Behavior (Year: 2019).*

Goossens et al., Effective Steering of Customer Journey via Order-Aware Recommendation (Year: 2018).*

Pei, et al., "PrefixSpan: Mining Sequential Patterns Efficiently by Prefix-Projected Pattern Growth," Proceedings of the 17th International Conference on Data Engineering, Apr. 2001. 10 pages.

Weiner, Peter, "Linear pattern matching algorithms," 14th Annual Symposium on Switching and Automata Theory (swat 1973), USA, 1973. 42 pages.

\* cited by examiner

Sorted Lists (Unique Actions)

✉ : 1, 4

📧 : 2, 8

🔍 : 3, 7

⬇ : 5

🖨 : 6

Action Pattern 1

Action Pattern 2

Action Pattern 3

DETERMINING PATTERNS WITHIN A STRING SEQUENCE OF USER ACTIONS

FIELD OF THE DISCLOSURE

This disclosure relates generally to the field of data analysis, and more particularly, to techniques for efficiently determining patterns within strings representative of a sequence of user actions.

BACKGROUND

Electronic journey analytics is often used to determine how a user most commonly navigates electronic tasks, such as navigating a website or using particular functions of a software application. The user may be, for example, a customer, a user of an application or online service, or a consumer of online digital content. Such journey data provides useful information to product developers, website designers, and advertisers, to help them understand common patterns of a person's usage when interacting with various products or interfaces. A user journey can be viewed as a sequence of events and interactions of the user over a relatively long period of time, such as within a given usage session or over multiple usage sessions. While some analytical tools have been developed to track user actions, these tools are static in nature and thus only focus on recognizing a limited number of patterns. However, it is often the situation that many different sequences of user actions, with each sequence containing possibly thousands of various user actions, are to be analyzed to answer different questions about user interaction. Therefore, complex and non-trivial issues associated with journey analytics remain.

SUMMARY

Techniques are provided herein for analyzing complex data that characterizes user actions that have occurred over a period of time. The actions can be, for example, with respect to the user's navigation of online content or interaction with an application (e.g., product or service). In any case, such user data is provided in an action string and effectively defines a given user's journey. The techniques are particularly well-suited for determining both the presence of and frequency of particular user actions and patterns of user actions within an action string of a particular user, as well as among multiple action strings of multiple users. An action string is a sequence of characters that all belong to a same set $\Sigma$. For example, an action string can include a sequence of letters (e.g., abcac) that belong to the set $\Sigma=\{a, b, c\}$. The letters of the sequence represent events or actions performed by a user over a period of time. When used in this way, an action string corresponds to a particular user journey. Subsequences of one or more action strings are identified and both the number of action strings that include a particular subsequence and the frequency that a particular subsequence is present in a given action string are determined. A subsequence of an action string is another string obtained by removing one or more characters from the original action string. For example, aca' is a subsequence of 'abcac'. Subsequences of an action string can be identified, for example, by breaking that action string into one or more sorted lists of locations for particular actions within that action string, as further explained below. Due to the resulting sorted nature of the so-processed action strings, binary search techniques can then be used to parse the sorted list(s) to quickly and efficiently identify locations of particular subsequences. This information is invaluable for answering questions regarding user interactions during their so-called journey, such as: how many users perform certain action subsequences? Or, what action subsequence is used most often by a particular user, or by a set of users? Numerous variations and embodiments of the disclosed techniques will be appreciated in light of this disclosure.

Any number of non-transitory machine-readable mediums (e.g., embedded memory, on-chip memory, read only memory, random access memory, solid state drives, and any other physical storage mediums) can be used to encode instructions that, when executed by one or more processors, cause an embodiment of the techniques provided herein to be carried out, thereby allowing for robust analysis of user data that has occurred over a period of time (user journey data). Likewise, the techniques can be implemented in hardware (e.g., logic circuits such as field programmable gate array, purpose-built semiconductor, microcontroller with a number of input/output ports and embedded routines). Numerous embodiments will be apparent in light of this disclosure.

DETAILED DESCRIPTION

Figure 1:
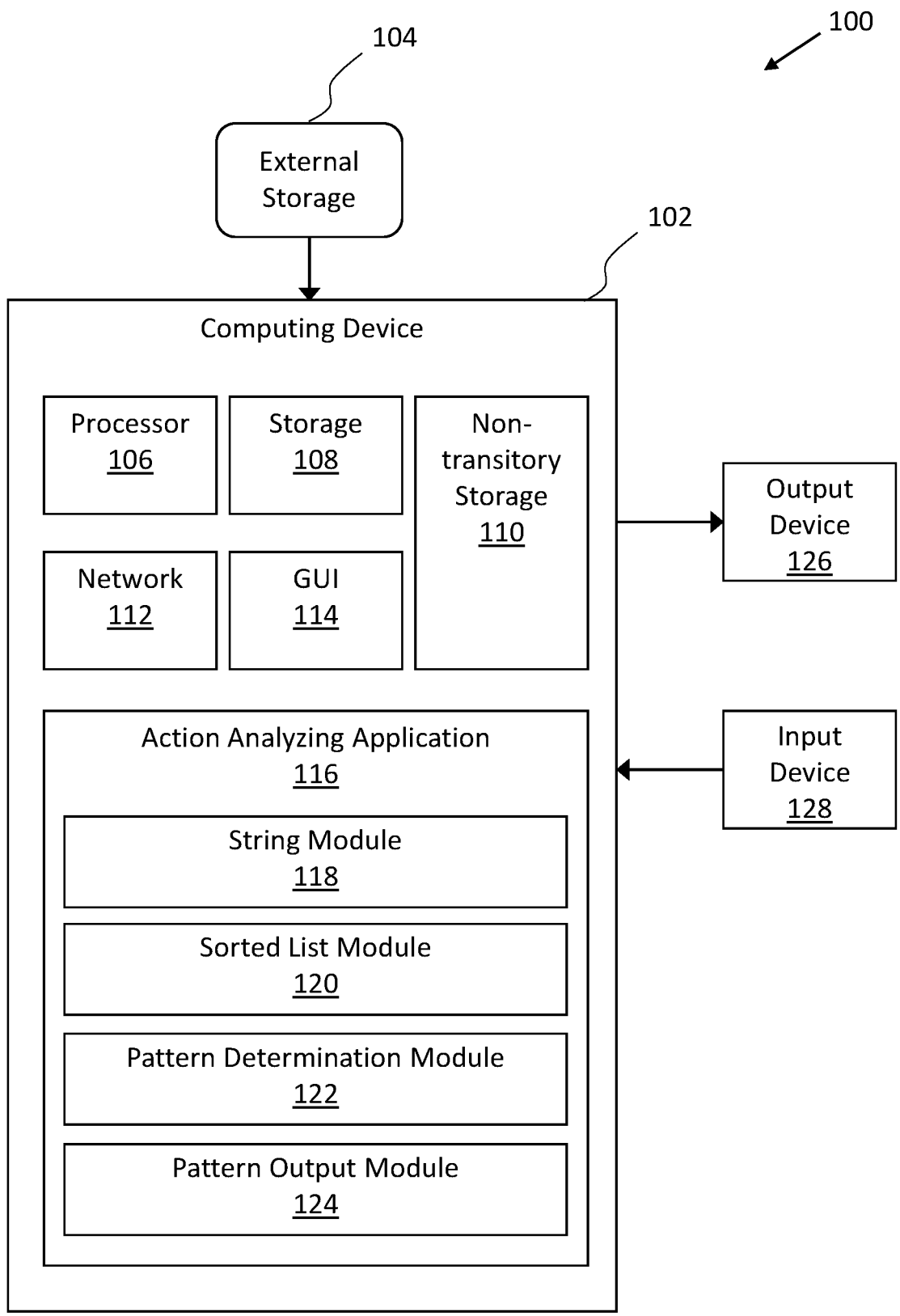
FIG. 1 shows an example system having an action analyzing application, in accordance with an embodiment of the present disclosure.

Techniques are provided herein for analyzing action strings that characterize user journey data, to determine subsequence presence within a given action string of a particular user, as well as across a set of multiple action strings of multiple users. This problem is complex due to the large amount of arbitrary data that must be analyzed, especially when considering multiple action strings. In order to address this problem, and in accordance with an embodiment herein, action strings are broken down into one or more sorted lists of locations for particular actions within the action strings. Thus, each location within a string is associated with a known action. This conversion process to produce location-based lists makes the data much more highly searchable, relative to searching the raw, complex data itself. Additionally, in accordance with some embodiments, sorted lists of locations for non-overlapping subsequences of varying length can be generated to determine the frequency of certain subsequences within a given action string. In any such cases, due to the sorted nature location-based lists, binary search techniques can be used to interrogate the sorted lists to quickly and efficiently identify the presence of particular subsequences. This information is invaluable for answering questions regarding user interactions during their so-called journey, such as how many users perform certain action subsequences? Or, what action subsequence is used most often by a particular user, or by a set of users? Numerous variations and embodiments will be appreciated in light of this disclosure.

As explained above, existing analytical tools tracking user actions are static in nature, because they focus on recognizing specific, fixed patterns. To this end, such existing tools are limited in the questions they can answer, and more generally such tools lack a suitable level of efficiency and dynamic performance because they fail to properly process user data so that it is more readily accessible to efficient search techniques. The present disclosure provides techniques that address this underlying problem by converting the data to be searched into a highly searchable format.

In more detail, and according to an embodiment, user actions are initially provided in the form of an action string. This string is effectively converted into highly searchable sorted lists of locations of different actions included in the action string. In one such embodiment, this conversion is carried out by sequentially traversing the action string and identifying locations (e.g., position within the action string) of each unique action. An action analyzing application can then use highly efficient search tools, such as successive binary searches, on the sorted lists to determine the presence of a given action subsequence. A pointer is used and updated by the action analyzing application to keep track of a location of a next action to be found in the action string until actions of a particular action subsequence have been identified. By searching through the sorted lists of the actions in an action string rather than searching through the action string itself, the runtime of the action analyzing application is logarithmic compared to the size of the action string. In contrast, a technique that attempts to search through the action string itself will yield a linear, much longer, computationally-intensive runtime. This faster runtime attributable to the location-based list techniques provided herein dramatically reduces the computational resources required to search through a large number of long action strings, according to some embodiments.

Another difficult problem addressed by the present disclosure has to do with determining how often particular non-overlapping subsequences appear in a given action string. This may include anything from determining what action subsequences a user most often performs to determining how often a user performs a particular action subsequence. However, the amount of data collected from users to make such determinations is extensive. Consider that an action string by a single user may include thousands of documented actions in a particular application or web site, and that such action strings may be collected from tens or hundreds of thousands of users to determine meaningful pattern usage. Navigating through so many user action strings becomes a daunting task that bogs down computing resources. To this end, the linear computation burden discussed above with respect to techniques that search raw user data is equally applicable here. The techniques provided herein lower that computational burden by effectively creating a more highly searchable form of the data, according to some embodiments.

In more detail, and according to some such embodiments, an action analyzing application is provided that is programmed or otherwise configured to determine how often particular non-overlapping subsequences appear in a given action string. This determination is then made for potentially hundreds of thousands of user action strings. Specifically, and according to some such embodiments, the action analyzing application receives an action string and creates sorted lists of locations of different actions in the action string, and then uses successive binary searches to build groups of additional sorted lists for possible action subsequence combinations of increasing length. Binary searching of the created sorted lists of action locations is used to identify locations of particular actions in the action string and generate N groups of additional sorted lists with each group n of additional sorted lists including sorted lists of locations where non-overlapping subsequences having n actions are present within the action string, wherein n is an integer that increases from 1 to N. By searching through the additional sorted lists of action subsequences to find frequencies of non-overlapping subsequence patterns rather than searching the action string itself to find frequencies of non-overlapping subsequence patterns, the runtime of the action analyzing application is much faster than the runtime of techniques that operate on raw, complex data. This faster runtime dramatically reduces the computational resources required to search through a large number of long action strings. In contrast, a technique that involves sequentially perusing each action of the action string to determine how often each possible action subsequence is present would be highly taxing on computing resources when trying to handle a large number of action strings. Furthermore, an action string that includes a large amount of unique actions would take even longer to analyze compared to an action string of the same length but with fewer unique actions due to the larger amount of possible action subsequence combinations.

Term Definition

As used herein, the term "action string" is a sequence of characters that all belong to a same set $\Sigma$. For example, an action string can include a sequence of letters (e.g., abcac) that belong to the set $\Sigma=\{a, b, c\}$. The individual letters represent events or actions performed by a user over a period of time. When used in this way, an action string corresponds to a particular user's journey (e.g., potential customer journey).

As used herein, a "unique action" of an action string is one of the actions that belongs to the set $\Sigma$. In the example provided above, 'a', and 'c' are the three unique actions of the action string.

As used herein, a "subsequence" of an action string is another string obtained by removing one or more characters from the original action string. For example, 'aca' is a subsequence of the action string 'abcac' where 'b' and the second 'c' are removed.

As used herein, an "action pattern" is any sequence of actions shorter in length than the action string. In some embodiments herein, determinations are made whether a received or generated action pattern is a subsequence of a given action string. In some example cases, an action pattern is provided via a query received from a user.

General Overview

As noted above, analyzing user journeys for repeated patterns across multiple users and within the journey of a particular user is a complex process. As will be appreciated in light of this disclosure, user actions may be tracked and stored in string format over a period of time and either analyzed after the journey is completed, or in real time as the user is continuing their journey. Examples of such user journeys that correspondingly create action strings may include how a user navigates a website, how a user navigates a particular graphical user interface (GUI), or the order of operations performed in a given software application (e.g., graphic design software, word processing software, image processing software, data analysis software, etc.). Patterns can emerge in the actions performed by a given user, or across multiple users, that can provide useful insight into how such software applications or websites are developed and/or marketed. Existing tools are limited in the questions they can answer about such user journeys, and more generally such tools lack a suitable level of efficiency and dynamic performance because they fail to properly process user data so that it is more readily accessible to efficient search techniques. The present disclosure provides techniques that address this underlying problem by converting the data to be searched into a highly searchable format that is accessible by efficient search techniques (e.g., binary searching) to more efficiently process action patterns within a user journey.

Thus, techniques are provided herein that allow action strings to be broken down into one or more sorted lists of action locations to more efficiently track and determine patterns of user interactions. Each location within a string is associated with a known action. Due to the resulting sorted nature of the so-processed action strings, binary search techniques can then be used to parse the sorted list(s) to quickly and efficiently identify locations of particular subsequences of the action string. This information allows for answering questions regarding user interactions during their journey, such as how many users performed a given action subsequence? Or, what action subsequence is used most often by a particular user, or by a set of users? Although many embodiments will be appreciated in light of this disclosure, one example embodiment provides a method for determining how many action strings include a particular action pattern as a subsequence of the action string. Another example embodiment provides a method for determining the frequency of various non-overlapping subsequences within a single action string. In a more general sense, methodologies are provided herein to analyze a given action string of a particular user for subsequences and patterns of interest, as well as to analyze a set of action strings or a group of users for subsequences and patterns of interest. These methodologies yield a direct improvement over existing techniques as they drastically reduce the computational burden of identifying action subsequences within large action strings. The faster runtime can be attributed to, for instance, the generation of sorted lists of actions and using binary searching, rather than linear searching of the raw, complex data itself, to more quickly and efficiently find subsequence patterns across one or more action strings.

The techniques may be embodied in devices, systems, methods, or machine-readable mediums, as will be appreciated. For example, according to a first embodiment of the present disclosure, a system is provided that is configured to recognize an action pattern amongst a plurality of action strings. The system includes at least one processor and various modules executable by the processor(s) to carry out the process of recognizing an action pattern amongst a plurality of action strings. The modules include a string module, a unique action list module, a pattern count module, and a pattern output module. The string module receives a plurality of S action strings, each action string s of the plurality of S action strings comprising a sequence of actions. The unique action list module is programmed or otherwise configured to, for one or more action strings s, and for one or more unique actions within a given action string, generate a sorted list of locations of a corresponding unique action within the given action string (so, for instance, a given unique action may appear in the list at locations 3, 25, and 66). The pattern count module receives an action pattern comprising a sequence of actions and, for each of the one or more action strings s, determines if the queried or otherwise received action pattern is present as a subsequence within the action string using one or more of the generated sorted lists associated with the given action string. The pattern output module provides a total number of action strings that include the action pattern. The system is configured to search through sorted lists of the actions in an action string rather than searching through the action string itself. This yields a logarithmic runtime compared to the size of the action string. In contrast, a technique that attempts to search through the action string itself will yield a linear runtime. According to some embodiments, the system's faster runtime is attributable to the location-based list sorting techniques provided herein that dramatically reduce the computational resources required to search through a large number of long action strings.

According to another embodiment of the present disclosure, a system is provided that is configured to recognize non-overlapping subsequences within an action string. The system includes at least one processor and various modules executable by the processor to carry out the process of recognizing non-overlapping subsequences within an action string. The modules include a string module, a unique action list module, an additional list module, a pattern frequency module, and a pattern output module. The string module receives the action string of interest. The action string comprises a sequence of actions. The unique action list module is programmed or otherwise configured to, for each unique action within the action string, generate a sorted list of locations of a corresponding unique action within the action string (so, for instance, a given unique action may appear in the list at locations 5, 7, 12, 13, 93 and 154). The additional list module is programmed or otherwise configured to use at least one of the sorted lists to generate N groups of additional sorted lists with each group n of additional sorted lists comprising sorted lists of locations where non-overlapping subsequences having n actions are present within the action string, where n is an integer that increases from 1 to N. The pattern frequency module receives a threshold value and uses any of the N groups of additional sorted lists to determine the one or more non-overlapping subsequences that are present within the action string a number of times that is at or above the threshold value. The pattern output module provides the one or more non-overlapping subsequences. The system is configured to build the additional sorted lists by finding locations of a given action and successively adding more actions to the subsequence to find locations of the newly created subsequences until there are no further subsequences that can exist at least the threshold number of times in the action string. This process identifies frequencies of non-overlapping subsequences at a faster pace compared to techniques that search the raw, complex data itself. According to some embodiments, the system's faster runtime is attributable to the location-based list sorting techniques, including generating multiple groups of sorted lists for action subsequences of varying length, as variously provided herein, which dramatically reduces the computational resources required to search through a large number of long action strings.

Numerous examples are described herein, and many others will be appreciated in light of this disclosure.

System Architecture

FIG. 1 shows an example system 100 that, among other things, implements an action analyzing application 116 to perform data analysis on one or more action strings, according to an embodiment. The system 100 includes various hardware components such as a computing device 102 having a processor 106, a storage 108, a non-transitory storage medium 110, a network interface 112, and a graphical user interface (GUI) 114. As will be appreciated, action analyzing application 116 may be part of a more comprehensive data analysis application. GUI 114 may include a display and a user input device. In some embodiments, GUI 114 represents a command-line interface.

According to some embodiments, processor 106 of the computing device 102 is configured to execute the following modules of action analyzing application 116, each of which is described in further detail below: String Module 118, Sorted List Module 120, Pattern Determination Module 122, and Pattern Output Module 124. In some embodiments, computing device 102 is configured to receive or retrieve one or more action strings corresponding to one or more users that are stored in external storage 104 or storage 108. External storage 104 may be local to device 102 (e.g., plug-and-play hard drive) or remote to device 102 (e.g., cloud-based storage), and may represent, for instance, a stand-alone external hard-drive, external FLASH drive or any other type of FLASH memory, a networked hard-drive, a server, or networked attached storage (NAS), to name a few examples. As will be discussed in more detail herein, each of the modules 118, 120, 122, and 124 are used in conjunction with each other to complete a process for determining and/or outputting particular action subsequences of one or more of the action strings.

Computing device 102 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices. Further note that device 102 may be, for example, a client in a client-server arrangement, wherein at least a portion of the action analyzing application 116 is served or otherwise made accessible to device 102 via a network (e.g., the Internet and a local area network that is communicatively coupled to the network interface 112).

Computing device 102 includes one or more storage devices 108 or non- transitory computer-readable mediums 110 having encoded thereon one or more computer-executable instructions or software for implementing techniques as variously described in this disclosure. The storage devices 108 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable mediums, for storing data and computer-readable instructions or software that implement various embodiments as taught in this disclosure. The storage device 108 can include other types of memory as well, or combinations thereof. The non-transitory computer-readable medium 110 can include, but is not limited to, one or more types of hardware memory, non-transitory tangible media (for example, one or more magnetic storage disks, one or more optical disks, one or more USB flash drives), and the like. The non-transitory computer-readable medium 110 included in the computing device 102 can store computer-readable and computer-executable instructions or software for implementing various embodiments (such as instructions for an operating system as well as a data analysis application that includes action analyzing application 116). The computer-readable medium 110 can be provided on the computing device 102 or provided separately or remotely from the computing device 102.

The computing device 102 also includes at least one processor 106 for executing computer-readable and computer-executable instructions or software stored in the storage device 108 or non-transitory computer-readable medium 110 and other programs for controlling system hardware. Processor 106 may have multiple cores to facilitate parallel processing or may be multiple single core processors. Any number of processor architectures can be used (e.g., central processing unit and co-processor, graphics processor, digital signal processor). Virtualization can be employed in the computing device 102 so that infrastructure and resources in the computing device 102 can be shared dynamically. For example, a virtual machine can be provided to handle a process running on multiple processors so that the process appears to be using only one computing resource rather than multiple computing resources. Multiple virtual machines can also be used with one processor. Network interface 112 can be any appropriate network chip or chipset which allows for wired or wireless connection between the computing device 102 and a communication network (such as local area network) and other computing devices and resources.

A user can interact with the computing device 102 through an output device 126, such as a screen or monitor, which can display one or more user interfaces or images, including a graphical representation of a user's action string, or a graphical representation of the results from analyzing subsequence patterns from the action string, as provided in accordance with some embodiments. Computing device 102 can include input or input/output devices 128 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 102 may include any other suitable conventional I/O peripherals. In some embodiments, computing device 102 includes or is operatively coupled to various suitable devices for performing one or more of the aspects as variously described in this disclosure.

The computing device 102 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 102 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as action analyzing application 116, string module 118, sorted list module 120, pattern determination module 122, pattern output module 124, GUI 114, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by one or more suitable processors in any number of configurations and arrangements, and that the depicted embodiments are not intended to be limiting. Various components of this example embodiment, including the computing device 102, can be integrated into, for example, one or more desktop or laptop computers, workstations, tablets, smart phones, game consoles, VR devices, set-top boxes, or other such computing devices. Other componentry and modules typical of a computing system, will be apparent.

According to some embodiments, string module 118 is configured to perform functions related to the generation and/or acquisition of action strings. When generating an action string, string module 118 may be configured to receive input via input device 128 that may include clicks from a mouse on certain screen positions, keystrokes on a keyboard, spoken instructions, etc. These inputs are translated into one or more actions being performed by the user. The actions may include, for example, opening a software application, accessing a function of a software application, navigating to a website, clicking on a link or button on a website, etc. The actions of a particular user may be concatenated together over a period of time as an action string, according to some embodiments. The action string may be stored in external storage 104 or storage 108 for future analysis. In some examples, the action string may be analyzed in real time as it is generated.

As noted above, string module 118 may also be configured to access or retrieve one or more action strings from external storage 104 or storage 108. The retrieval may occur in response to a received request for the one or more action strings provided by action analyzing application 116.

Figure 2:
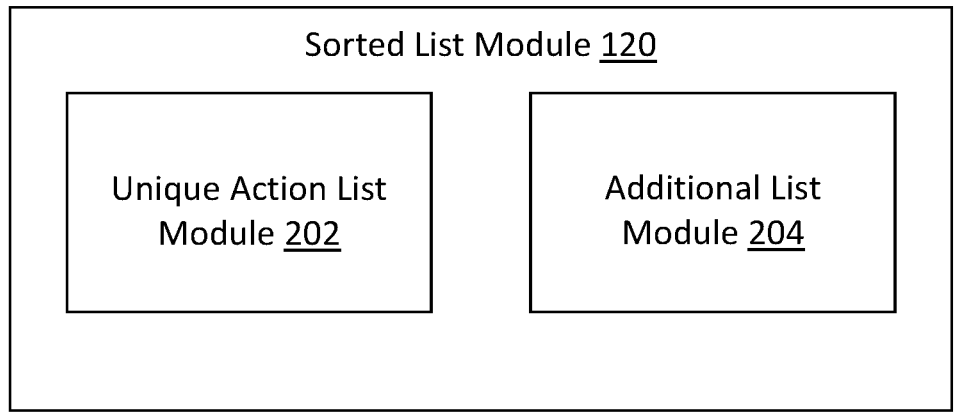
FIG. 2 shows an example sorted list module, in accordance with an embodiment of the present disclosure.

According to some embodiments, sorted list module 120 is configured to generate one or more sorted lists of locations of actions and action subsequences within a given action string. As illustrated in FIG. 2, sorted list module 120 includes two modules for generating sorted lists, a unique action list module 202 and an additional list module 204. In some embodiments, unique action list module 202 traverses an action string sequentially and tallies locations within the action string for each unique action to generate a sorted list associated with each of the unique actions. In some such embodiments, pointers are used to track the current location within the action string as it is traversed. Once the action string has been fully traversed for a given action, the process can be repeated for another action in order to generate a different sorted list of locations for each unique action of the action string. An example using letter characters for ease of discussion is provided where an action string 'abcbac' would have three unique actions, 'a', and 'c'. A sorted list for action 'a' would be {1, 5} to indicate that the action 'a' is located at positions 1 and 5 of the action string from left to right. A sorted list for action 'b' would be {2, 4} to indicate that the action 'b' is located at positions 2 and 4 of the action string from left to right. And a sorted list for action 'c' would be {3, 6} to indicate that the action 'c' is located at positions 3 and 6 of the action string from left to right. These sorted lists may be referred to herein as a group of unique action sorted lists as they contain locations for each unique action within the action string.

According to some embodiments, additional list module 204 is configured to generate additional groups of sorted lists having locations of action subsequences of length two or greater. For example, a given action string may have a first group of sorted lists that include unique sorted lists generated by unique action list module 202, a second group of sorted lists having locations for various action subsequences of length=2 generated by additional list module 204, and a third group of sorted lists having locations for various action subsequences of length=3 generated by additional list module 204. Successive binary searches are used to build the groups of additional sorted lists for possible action subsequence combinations of increasing length. Binary searching of the created sorted lists of action locations is used to identify locations of particular actions in the action string and generate N groups of additional sorted lists with each group n of additional sorted lists including sorted lists of locations where non-overlapping subsequences having n actions are present within the action string, wherein n is an integer that increases from 1 to N. Any number of additional groups of sorted lists can be generated for however many action subsequence lengths. The generation of these additional sorted lists is further described in view of the examples provided herein with reference to FIGS. 9-11.

Figure 3:
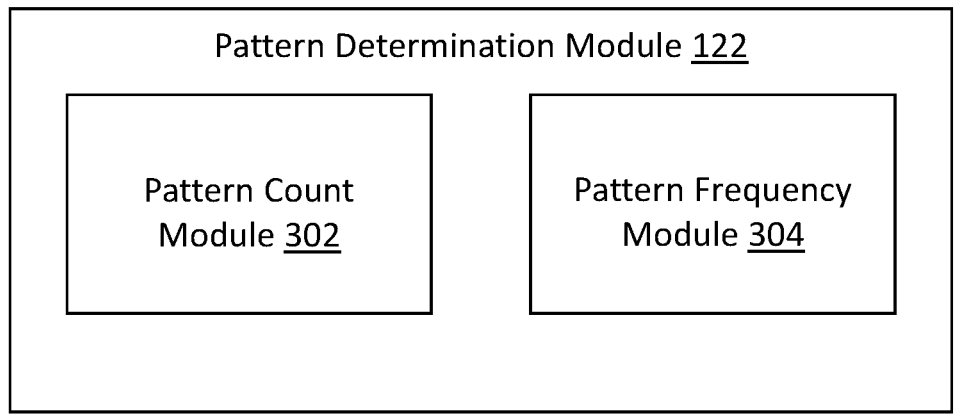
FIG. 3 shows an example pattern determination module, in accordance with an embodiment of the present disclosure.

According to some embodiments, pattern determination module 122 is configured to analyze one or more action patterns and/or one or more action strings and make determinations regarding the frequency of the one or more action patterns or various subsequences within the one or more action strings. As illustrated in FIG. 3, pattern determination module 122 includes two modules for action string analysis: a pattern count module 302 and a pattern frequency module 304. In some embodiments, pattern count module 302 is configured to use the group of unique action sorted lists generated by unique action list module 202 to determine if a given action pattern is present as a subsequence in an action string. As an example, a received action pattern of 'aca' would be found as a subsequence in a first action string 'ab̲cc̲ab̲ab', but would not be found in a second action string 'bbcaabac'. Due to the sorted nature of the group of unique action sorted lists, a binary search of the sorted lists may be used to more efficiently determine if the action string is present. Briefly, a pointer is used to track the position within the action string and is continuously updated after each action of the action pattern is found. The current position of the pointer is used when performing a binary search of the sorted list for the next action of the action string to determine if a location of the next action exists that is after the current pointer position. When analyzing multiple action strings, a count of the total number of action strings that include the action pattern as a subsequence is determined, according to some embodiments. Further details of how the action string is analyzed using the group of unique action sorted lists are provided herein with reference to FIGS. 5-8.

According to some embodiments, pattern frequency module 304 is configured to determine the number of times that certain non-overlapping subsequences are present within a given action string by using the additional sorted lists generated by additional list module 204. In some embodiments, frequencies of all possible subsequences of any length within an action are determined. Once these frequencies have been determined, pattern frequency module 304 may be configured to identify which of the subsequences are present in the action string a threshold number of times (e.g., which non-overlapping subsequences are present at least three times in the action string?) Further details of how the subsequence pattern frequencies are determined using the additional sorted lists are provided herein with reference to FIGS. 9-11.

Figure 4:
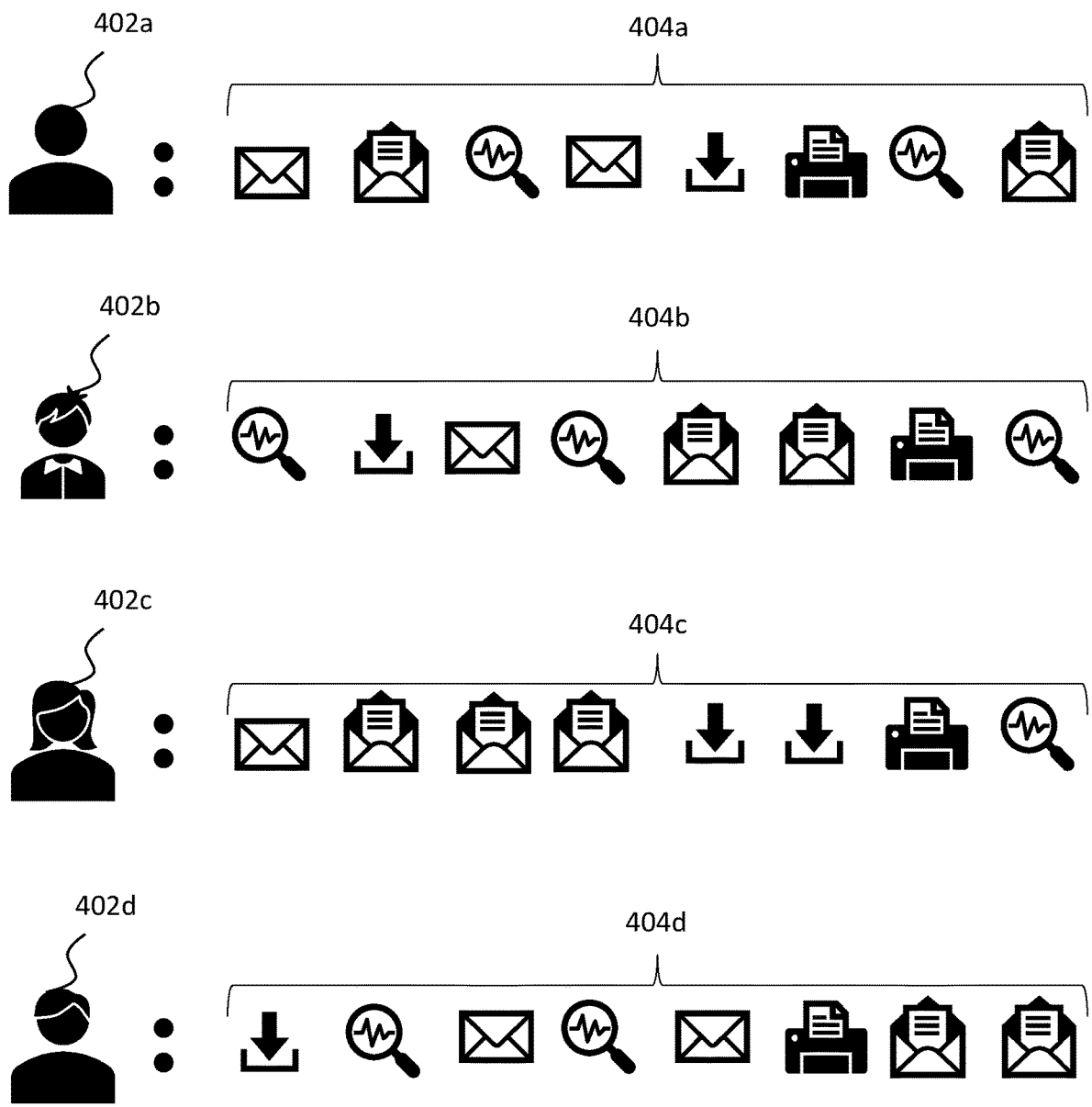
FIG. 4 shows a representation of example action strings for different users, in accordance with some embodiments of the present disclosure.

FIG. 4 illustrates example users 402a-402d and their corresponding action strings 404a-404d, according to some embodiments. Although only one action string is provided per user for ease of discussion, it should be understood that any number of action strings of any length could be generated and/or stored for a given user. For example, a first user 402a may generate different action strings at different times while a second user 402b may generate a different number of action strings at different times. All of the action strings 404a-404d may be stored in memory after being generated. When generating an action string, a string module may be configured, for instance, to receive input via any input device that includes clicks from a mouse on certain screen positions, keystrokes on a keyboard, or spoken instructions, to name a few examples. These inputs are translated into one or more actions being performed by the user.

Each of the action strings 404a-404d provides a snapshot of a sequence of actions being performed by a given user over a period of time, according to some embodiments. For example, a first action string 404a may be generated for a first user 402a that includes a series of actions performed by first user 402a. Following the icons of first action string 404a, the series of actions are: accessing a mail application, opening an email, performing a search, accessing the mail application, downloading data, printing a document, performing a search, and opening an email. In one example, actions related to a mail application, such as Microsoft Outlook, are being tracked and included within each action string 404a-404d. Obviously, these are merely provided as examples, and any action types could be included in a given action string. For example, actions relating to navigating a website or making purchasing decisions online may also be tracked as one or more action strings.

Figure 5:
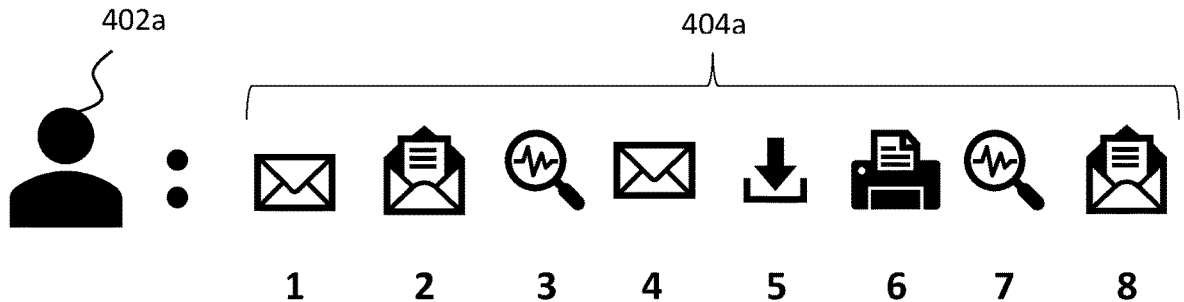
FIG. 5 shows a representation of an example action string along with a location-based sorted list of actions within the action string, in accordance with an embodiment of the present disclosure.
Figure 5:
Figure 5:
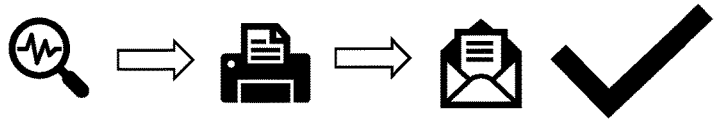
Figure 5:
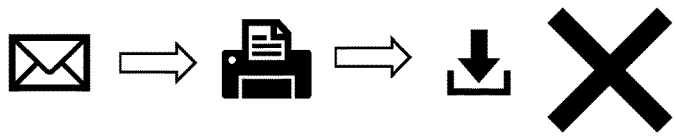

FIG. 5 illustrates a particular example of using action string 404a from user 402a and determining if certain action patterns are present within action string 404a. According to some embodiments, a group of sorted lists for each unique action are generated using, for example, unique action list module 202 in order to provide a faster and more efficient method of sequentially analyzing the actions of action string 404a. The sorted lists may be generated by unique action list module 202 as action string 404a is generated or may be generated after the completion of action string 404a. In some embodiments, the generated sorted lists are stored along with action string 404a in memory.

According to some embodiments, the sorted lists of unique actions are generated by finding each unique action and identifying the locations of that unique action until all unique actions have been found. In the illustrated example, the 'letter' action includes a sorted list having locations 1 and 4, the 'opened letter' action includes a sorted list having locations 2 and 8, the 'search' action includes a sorted list having locations 3 and 7, the 'download' action includes a sorted list having a single location 5, and the 'print' action includes a sorted list having a single location 6. According to some embodiments, a unique action list module uses pointers to track the current location within the action string as it is traversed. Once the action string has been fully traversed for a given action, the sorted list for that action has been generated and the process is repeated for another action in order to generate a different sorted list of locations for that next action. Once the group of sorted lists is formed, locations of the various actions within action string 404a can be quickly assessed without needing to analyze each action of action string 404a in a sequential manner.

Some examples of using the sorted lists to determine the presence of given action patterns will now be provided. Any of the operations related to determining the presence of provided action patterns within the action string may be performed by pattern count module 302.

Action Pattern 1 identifies a first example action pattern that is received to determine if Action Pattern 1 is present as a subsequence within action string 404a. Action Pattern 1 may represent a determination of whether a user accessed a mail application and subsequently opened an email. The first action of Action Pattern 1 is the 'letter' action. Thus, the sorted list for the 'letter' action is accessed and the first instance of 'letter' is found at location 1. A pointer is set to location 1 to maintain a current location within action string 404a after a given action has been found. The next action in Action Pattern 1 is the 'opened letter' action. Thus, the sorted list for the 'opened letter' action is accessed to determine if there are any locations of the 'opened letter' action that proceed the location of the previous action in Action Pattern 1 (which in this case is the 'letter' action at location 1). Indeed, the 'opened letter' action is observed at both locations 2 and 8 of action string 404a. The pointer is set to location 2 to indicate that the next 'opened letter' action in action string 404a was found at location 2. At this point, it has been determined that Action Pattern 1 does exist as a subsequence within action sting 404a. Action Pattern 1 also exists as a subsequence within action string 404b (locations 3 and 5), within action string 404c (locations 1 and 2), and within action string 404d (locations 3 and 7). Accordingly, pattern count module 302 may return a binary 'yes' indication regarding Action Pattern 1 for action string 404a.

Action Pattern 2 identifies a second example action pattern that is received to determine if Action Pattern 2 is present as a subsequence within action string 404a. Action Pattern 2 may represent a determination of whether a user performed a search, followed by printing a document, followed by opening an email. The first action of Action Pattern 2 is the 'search' action. Thus, the sorted list for the 'search' action is accessed and the first instance of 'search' is found at location 3. A pointer is set to location 3 to maintain a current location within action string 404a after a given action has been found. The next action in Action Pattern 2 is the 'print' action. Thus, the sorted list for the 'print' action is accessed to determine if there are any locations of the 'print' action that proceed the location of the previous action in Action Pattern 2 (which in this case is the 'search' action at location 3). Indeed, the 'print' action is observed at location 6 of action string 404a. The pointer is set to location 6 to indicate that the next 'print' action in action string 404a was found at location 6. The next action in Action Pattern 2 is the 'opened letter' action. Thus, the sorted list for the 'opened letter' action is accessed to determine if there are any locations of the 'opened letter' action that proceed the location of the previous action in Action Pattern 2 (which in this case is the 'print' action at location 6). Indeed, the 'opened letter' action is observed at location 8 of action string 404a. The pointer is set to location 8 to indicate that the next 'opened letter' action in action string 404a was found at location 8. At this point, it has been determined that Action Pattern 2 does exist as a subsequence within action sting 404a. Action Pattern 2 does not exist as a subsequence within action string 404b or 404c, but it does exist as a subsequence within action string 404d (locations 2, 6, and 7). Accordingly, pattern count module 302 may return a binary 'yes' indication regarding Action Pattern 2 for action string 404a.

Action Pattern 3 identifies a third example action pattern that is received to determine if Action Pattern 3 is present as a subsequence within action string 404a. Action Pattern 3 may represent a determination of whether a user accessed a mail application, followed by printing a document, followed by performing a download action. The first action of Action Pattern 3 is the 'mail' action. Thus, the sorted list for the 'mail' action is accessed and the first instance of 'mail' is found at location 1. A pointer is set to location 1 to maintain a current location within action string 404a after a given action has been found. The next action in Action Pattern 3 is the 'print' action. Thus, the sorted list for the 'print' action is accessed to determine if there are any locations of the 'print' action that proceed the location of the previous action in Action Pattern 3 (which in this case is the 'mail' action at location 1). Indeed, the 'print' action is observed at location 6 of action string 404a. The pointer is set to location 6 to indicate that the next 'print' action in action string 404a was found at location 6. The next action in Action Pattern 3 is the 'download' action. Thus, the sorted list for the 'download' action is accessed to determine if there are any locations of the 'download' action that proceed the location of the previous action in Action Pattern 3 (which in this case is the 'print' action at location 6). There are no locations of the 'download' action found in its sorted list that are greater than 6. Accordingly, Action Pattern 3 is determined to not be present as a subsequence within action string 404a and pattern count module 302 may return a binary 'no' indication regarding Action Pattern 3 for action string 404a. Action Pattern 3 also does not exist as a subsequence within any of action strings 404b, 404c or 404d.

In each of the examples above, the group of sorted lists for the unique actions was used, rather than the original action string 404a, to determine if a given action pattern existed as a subsequence of action string 404a. Fewer operations are required when using the sorted lists, since the location information of the various actions is organized. Compared to using a sequential search of each action in the action string, the method embodied by the examples above is faster by a factor of around 20. As the number of actions in the action string increases, the difference between the speed of determining the presence of a given action pattern using the above method compared to naïve sequential searching becomes even more pronounced. This is due to the logarithmic run time of the described method, with runtime generally being represented as $|q||log|s|$, with q being the action pattern length and s being the action string length. The logarithmic runtime of the described methodology yields a significant computational advantage over methods that endeavor to search the raw data itself.

In some embodiments, the sorted nature of the lists allows for binary searching through a given sorted list to determine a next location of an action. Although the action string 404a example is not long or complex enough to showcase the advantage of a binary search, for very long action strings having numerous instances of different actions, binary searching can substantially reduce the time to find a next location for a given action within its sorted list. Take, as an example, a sorted list for a given action having locations {1, 3, 6, 8, 9, 11, 14, 15, 18}. Continuing this example, using a binary search to determine whether the given action exists at a location in the action string greater than 10 is much faster than sequentially checking each value of the sorted list to find one greater than 10. Briefly, binary searching works by breaking the sorted list into half and determining which half to search next for a value greater than a given number. In the example above, the location value '9' is present at the midpoint of the sorted list. Since the search is looking for a location greater than 10, all elements of the sorted list below '9' are ignored and the searching continues using the same process with only those elements greater than 9—{11, 14, 15, 18}. Some additional processing shortcuts may also be taken by leveraging the fact that the exact location of a subsequence is not required, merely whether or not the subsequence exists in the action string. Leveraging the binary search techniques along with the sorted lists yields a search technique that is a direct improvement over existing techniques due to a reduction of the computational burden of identifying action subsequences within large action strings. The faster runtime can be attributed to both the generation of the sorted lists of actions and the binary searches of the sorted lists to more quickly and efficiently find subsequence patterns across one or more action strings.

Figure 6:
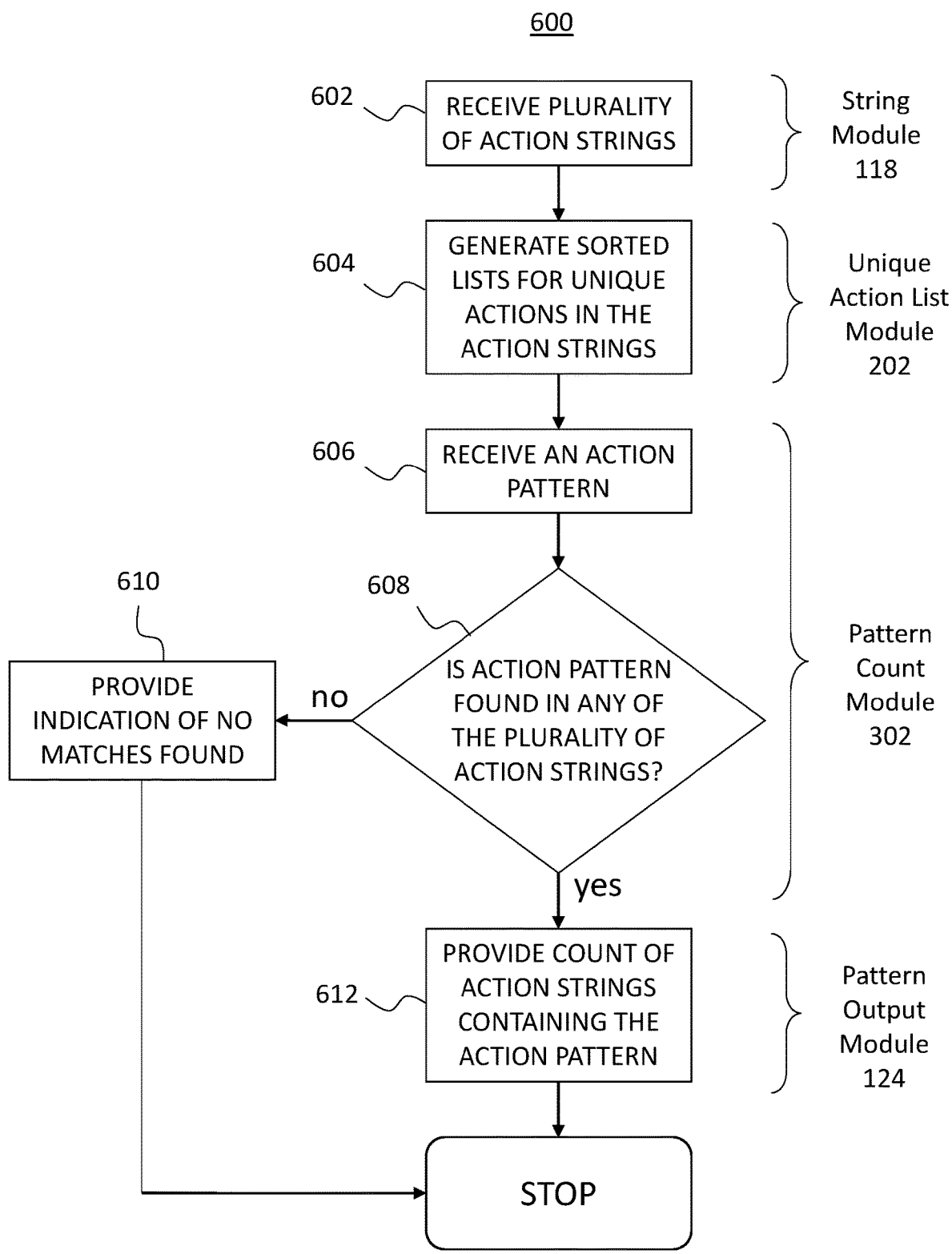
FIG. 6 is a flow diagram of a process for determining a number of actions strings that include a particular subsequence, in accordance with some embodiments of the present disclosure.

FIG. 6 illustrates an example method 600 of determining a number of action strings that contain a given action pattern as a subsequence of the action string, according to an embodiment. For example, one or more of the operations of method 600 are shown graphically in FIG. 5. The operations, functions, or actions described in the respective blocks of example method 600 may be stored as computer-executable instructions in a non-transitory computer-readable medium, such as a memory and/or a data storage of a computing system. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion.

At block 602, a plurality of action strings are received using, for example, string module 118, according to an embodiment. The plurality of action strings may be retrieved from a local and/or external memory. In some embodiments, one or more of the action strings are generated by tracking user actions and building the action string over a period of time by concatenating the actions. Some examples of user actions to include in an action string include, for instance, clicks from a mouse on certain screen positions, keystrokes on a keyboard, or spoken instructions.

At block 604, a sorted list for each unique action in a given action string from the plurality of action strings is generated using, for example, unique action list module 202, according to an embodiment. Each sorted list is generated by finding each unique action of a given action string and identifying all of the locations of that unique action in the action string. According to some embodiments, pointers are used to track the current location within the action string as it is traversed. Once the action string has been fully traversed for a given action, the sorted list for that action has been generated and the process is repeated for another action in order to generate a different sorted list of locations for that next action. The identified locations are listed in order from lowest position to highest position within the action string, according to some embodiments. In some other embodiments, the identified locations are listed in order from highest position to lowest position within the action string. An example of a group of sorted lists generated for five unique actions is provided in FIG. 5. The generation of the sorted lists for unique actions may take place immediately following the creation of the associated action string. The sorted lists may be stored in memory along with the associated action string, such that retrieval of the action string also retrieves the associated sorted lists, in accordance with some embodiments. More detailed operations of block 604 are provided in FIG. 7.

At block 606, an action pattern is received using, for example, pattern count module 302, according to an embodiment. An action pattern includes a sequence of any number of actions. In some embodiments, the action pattern is received from a user via input device 128. The action pattern may represent a query regarding how many users (or how often a single user) perform certain actions in a given order. For example, a question of "how many users view a particular product online and then add it to their cart?" may be associated with an action pattern of length=2 with a first action corresponding to viewing the product and a second action corresponding to adding the product to the cart. The action pattern may then be used to make determinations of how many of the action strings include the action pattern as a subsequence.

At block 608, a determination is made using, for example, pattern count module 302, regarding whether the action pattern is found as a subsequence in any of the plurality of action strings. The sorted lists associated with each action string of the plurality of action strings are used to make the determination of whether or not the action pattern is present as a subsequence. In some embodiments, binary searches may be performed on one or more of the sorted lists to speed up the process of finding locations of particular actions from the action pattern within a given action string. According to some embodiments, one or more pointers is used to track a position within the action string and is continuously updated after each action of the action pattern is found. The current position of the pointer is used when performing a binary search of the sorted list for the next action to determine if a location of the next action within the action string exists that is after the current pointer position. If so, the process is repeated for the next action of the action pattern, and if not, the action pattern is determined to not be found within the action string. More detailed operations of block 608 are provided in FIG. 8.

If the action pattern is not found as a subsequence in any of the action strings, then method 600 proceeds to block 610 where an indication that no matches were found is provided, according to an embodiment. This indication may be a message that is provided to a user via, for example, output device 126. In some embodiments, this indication is provided by setting a flag or bit in memory to represent that no matches were found for the associated action pattern. Block 610 may be performed by pattern count module 302, as illustrated in FIG. 6, however, in some embodiments, block 610 is performed by pattern output module 124.

If the action pattern is found in at least one of the action strings, method 600 proceeds to block 612 where a count of the total number of action strings containing the action pattern as a subsequence is provided using, for example, pattern output module 124. The count may be provided as a message to a user via, for example, output device 126. In some embodiments, the count may be provided along with the action strings that include the action pattern as a subsequence. In some embodiments, the count is stored in memory and may be stored along with an indication of which of the action strings included the action pattern as a subsequence.

Figure 7:
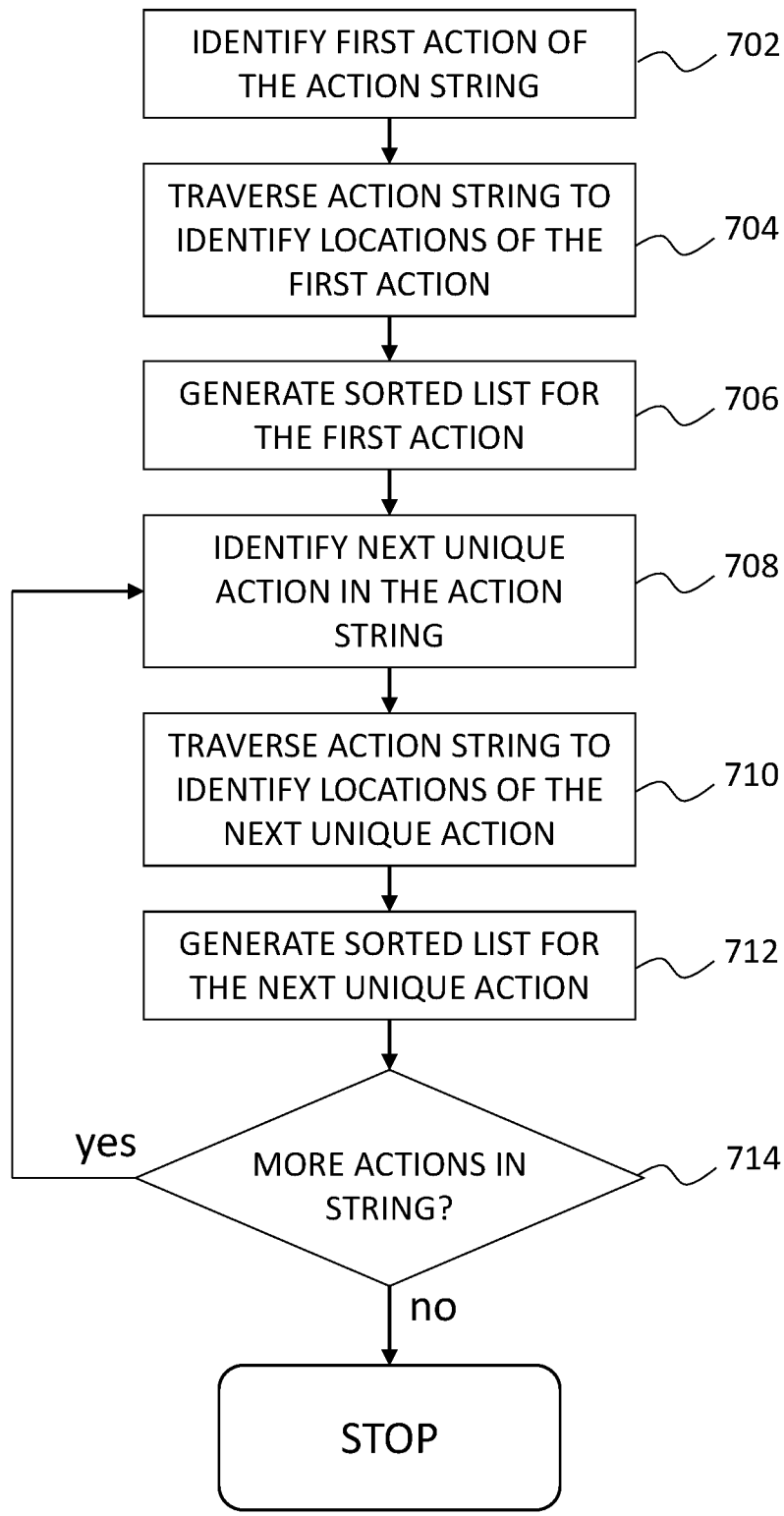
FIG. 7 is a flow diagram of a process for generating sorted lists for unique actions in a given action string, in accordance with some embodiments of the present disclosure.

FIG. 7 illustrates an example flowchart providing further operations of block 604 (also referred to herein as method 604) from method 600, according to an embodiment. The operations, functions, or actions described in the respective blocks of example method 604 may be stored as computer-executable instructions in a non-transitory computer-readable medium, such as a memory and/or a data storage of a computing system. As will be further appreciated in light of this disclosure, for this and other processes and methods disclosed herein, the functions performed in method 604 may be implemented in a differing order. Additionally, or alternatively, two or more operations may be performed at the same time or otherwise in an overlapping contemporaneous fashion. It should be understood that method 604 provides the operations for generating sorted lists of the unique actions in a single action string, and that method 604 is repeated for each action string, according to some embodiments.

Method 604 begins with block 702 where the first action of a given action string is identified, according to an embodiment. In the example of action string 404a, the first action would be the "letter" action.

At block 704, the action string is traversed to identify each location for the first action, according to an embodiment. The action string may be traversed sequentially to identify each location that the first action appears. Since the first action is being identified, it will always be located at least at the first location within the action string.

At block 706, a sorted list for the first action is generated, according to an embodiment. The sorted list associated with the first action includes an ordered list of the locations of the first action within the action string (e.g., from earliest location to latest location in the action string).

At block 708, a next unique action is identified in the action string, according to an embodiment. The next unique action is determined by beginning with the earliest identified action and sequentially progressing through the action string until a next unique action has been identified. In the example of action string 404a, the next unique action would be the "open letter" action.

At block 710, the action string is traversed to identify each location for the next unique action previously identified in block 708, according to an embodiment. The action string may be traversed sequentially to identify each location that the next unique action appears.

At block 712, a sorted list for the next unique action identified in block 708 is generated, according to an embodiment. The sorted list associated with the next unique action includes an ordered list of the locations of the next unique action within the action string (e.g., from earliest location to latest location in the action string).

At block 714, method 604 determines if there are any more unique actions within the action string, according to an embodiment. If all locations of the action string have been associated with an action (e.g., the sorted lists generated so far include all locations in the action string), then there are no more actions to generate lists for and method 604 ends. At this point, a sorted list has been generated for each unique action within the action string. If there are still one or more unique actions remaining that do not yet have an associated sorted list, then method 604 returns to block 708 to identify the next unique action in the action string and repeat the operations of blocks 710, 712, and 714.

Figure 8:
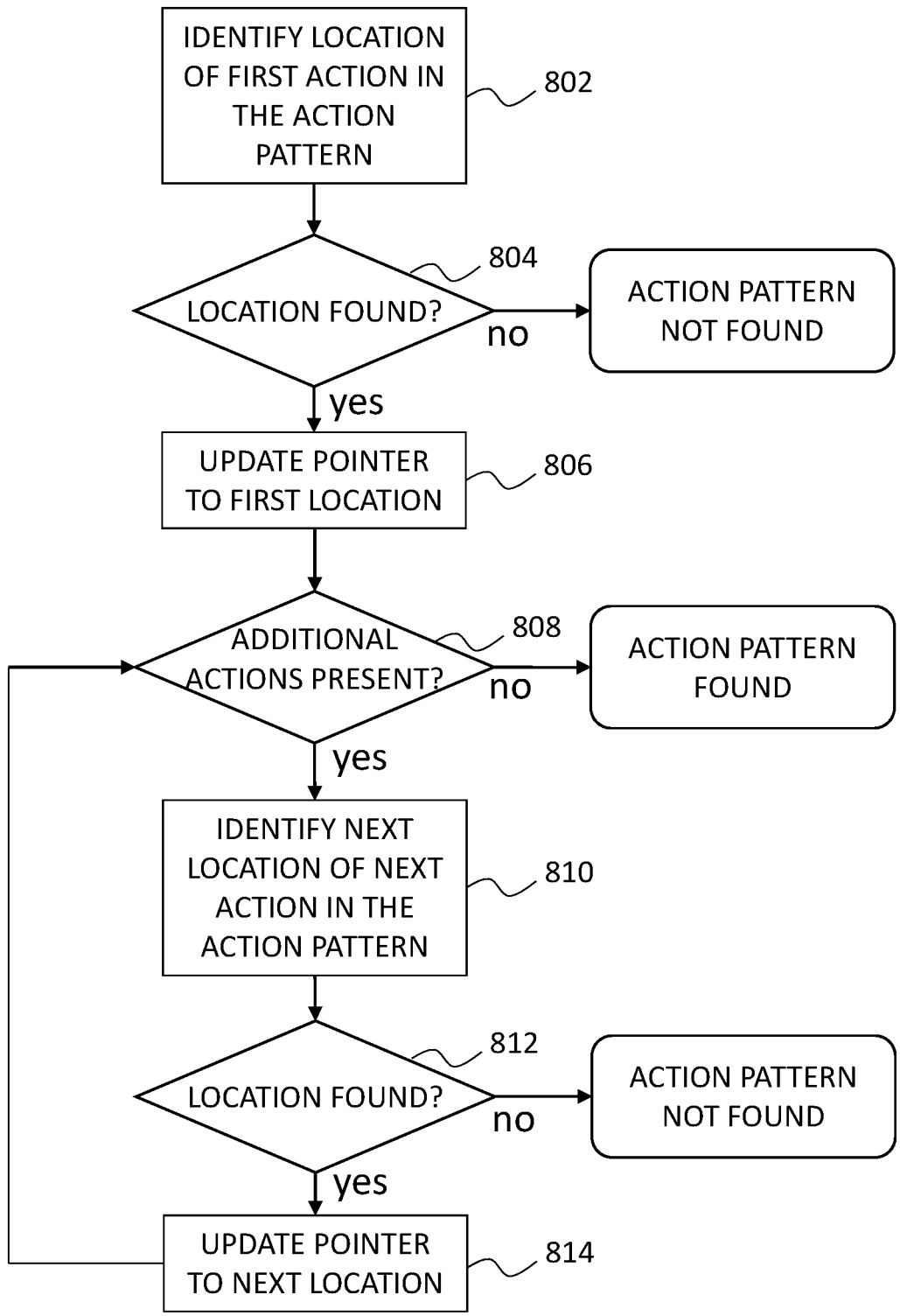
FIG. 8 is a flow diagram of a process for locating an action pattern as a subsequence within a given action string, in accordance with some embodiments of the present disclosure.

FIG. 8 illustrates an example flowchart providing further operations of block 608 (also referred to herein as method 608) from method 600, according to an embodiment. The operations, functions, or actions described in the respective blocks of example method 608 may be stored as computer-executable instructions in a non-transitory computer-readable medium, such as a memory and/or a data storage of a computing system. As will be further appreciated in light of this disclosure, for this and other processes and methods disclosed herein, the functions performed in method 608 may be implemented in a differing order. Additionally, or alternatively, two or more operations may be performed at the same time or otherwise in an overlapping contemporaneous fashion. It should be understood that method 608 provides the operations for finding a given action pattern in a single action string, and that method 608 is repeated for each action string, according to some embodiments.

Method 608 begins with block 802 where the location of a first action in the action pattern is identified in the action string, according to an embodiment. The sorted list associated with the first action is accessed to find the first location of the first action (e.g., the first element within the sorted list).

At block 804, if no location is found for the first action in the action pattern, then the action pattern is not present in the action string and method 608 returns an indication that the action pattern is not found in the current action string, according to an embodiment. However, if a location is found for the first action in the action string, then method 608 continues with block 806.

At block 806, a pointer is updated to identify the location of the first action in the action string, according to an embodiment. For example, if the first action is found at location 3 in the action string, then the pointer is updated to location 3. The pointer is continually updated to keep track of where along the action string further searching should take place for a next action of the action pattern.

At block 808, a determination is made whether additional actions are present in the action pattern, according to an embodiment. If no additional actions are present in the action pattern, then all actions of the action pattern have been identified as a subsequence within the action string and method 608 returns an indication that the action pattern has been found in the current action string. However, if there are additional actions in the action pattern, the method 608 continues with block 810.

At block 810, a next location of the next action in the action pattern is identified. The sorted list associated with the next action is accessed to find the next location of the next action greater than the current pointer location within the action string. The various elements of the sorted list associated with the next action may be traversed sequentially to find the next location in the action string following the current pointer location. However, in accordance with some embodiments, a binary search of the sorted list is used to find the next location in the list following the current pointer location.

At block 812, if no location (greater than the current pointer location) of the next action is found, then the action pattern is not present in the action string and method 608 returns an indication that the action pattern is not found in the current action string, according to an embodiment. However, if a location (greater than the current pointer location) is found for the next action in the action string, then method 608 continues with block 814.

At block 814, the pointer is updated to identify the location of the next action in the action string determined in block 810, according to an embodiment. For example, if the next action is found at location 7 in the action string, then the pointer is updated to location 7. After updating the pointer location, method 608 returns to block 808 and, if additional actions are present in the action pattern, repeats the operations of blocks 810, 812, and 814.

Figure 9:
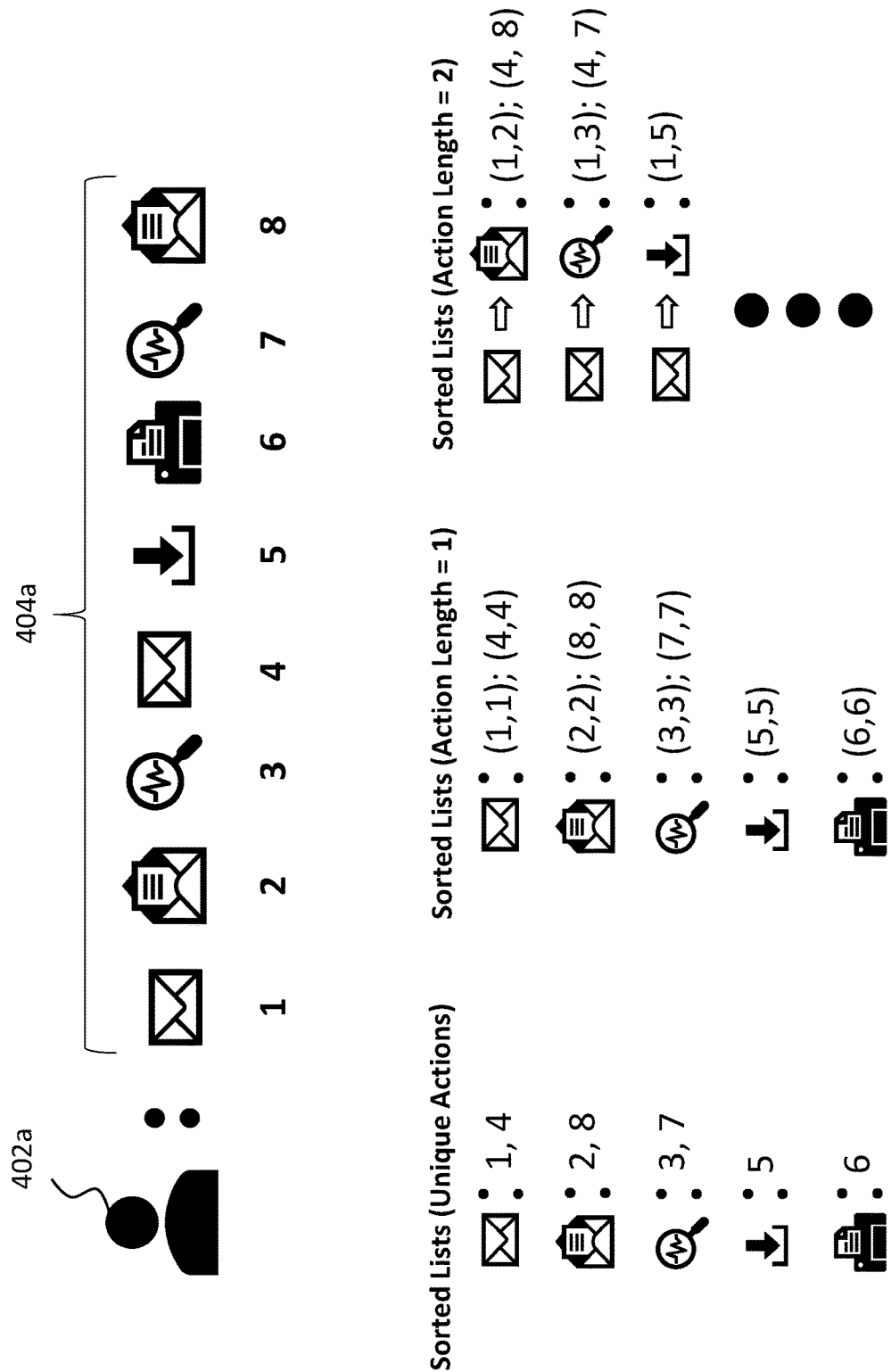
FIG. 9 shows a representation of an example action string along with location-based sorted lists of actions with increasing action lengths within the action string, in accordance with an embodiment of the present disclosure.

FIG. 9 illustrates a particular example of using action string 404a from user 402a and determining the frequency of non-overlapping subsequences within action string 404a. According to some embodiments, a first group of sorted lists for each unique action are generated using, for example, unique action list module 202, in the same way as described above with reference to FIG. 7. However, one or more additional groups of sorted lists are also generated to track locations of non-overlapping instances of different subsequences of increasing length. According to some embodiments, binary searching of the sorted lists for the unique actions is used to identify locations of particular actions in the action string and generate N groups of additional sorted lists with each group n of additional sorted lists including sorted lists of locations for non-overlapping subsequences having n actions that are present within the action string, wherein n is an integer that increases from 1 to N. Any of the group of sorted lists of unique actions and the one or more additional groups of sorted lists may be stored in memory along with the associated action string 404a.

In the illustrated example, an additional group of sorted lists is generated for actions of length=1. The sorted lists of each of the additional groups include start and end positions for each instance of the actions. For example, the action subsequence of the "letter" action includes a first instance in action string 404a that starts at location 1 and ends at location 1, and a second instance in action string 404a that starts at location 4 and ends at location 4. Since the length of the actions of this additional group is only one, this group of sorted lists is essentially identical to the group of sorted lists of unique actions, and thus may not be generated in some embodiments.

Another group of sorted lists is be generated for actions of length=2, in accordance with an embodiment. For example, the first action pattern of "letter" followed by "opened letter" includes a first subsequence in action string 404a that starts at location 1 and ends at location 2, and a second subsequence in action string 404a that starts at location 4 and ends at location 8. The group of sorted lists for the unique actions may be used in a similar fashion to that described in FIG. 5 in order to determine the number of non-overlapping subsequences existing in action string 404a for a corresponding action pattern. Briefly, the first action of the first action pattern is the 'letter' action. Thus, the sorted list for the 'letter' action is accessed and the first instance of 'letter' is found at location 1. A pointer is set to location 1 to maintain a current location within action string 404a after a given action has been found. The next action in the first action pattern is the 'opened letter' action. Thus, the sorted list for the 'opened letter' action is accessed to determine if there are any locations of the 'opened letter' action that proceed the location of the previous action (which in this case is the 'letter' action at location 1). Indeed, the 'opened letter' action is observed at both locations 2 and 8 of action string 404a. According to some embodiments, a binary search of the sorted list for the 'opened letter' action is used to determine the next highest location within the sorted list after the pointer location (e.g., 1), and this next highest location would be determined to be 2 in this example. The pointer is set to the next available location (location 2) to indicate that the next 'opened letter' action in action string be used to answer various analytical questions about action string 404a. For example, a query such as "what action pattern(s) is repeated the greatest number of times by user 402a" may be answered by using the additional groups of sorted lists to find the action pattern (or action patterns) that have the highest number of non-overlapping instances within action string 404a. In another example, a query such as "what action patterns are repeated at least x times by user 402a" may also be answered by returning each of the action patterns found to have at least x instances within action string 404a. In the latter example, the threshold value x may be predetermined or received by a user via, for example, input device 128.

According to some embodiments, the threshold value x is used to reduce the number of possible action patterns provided in each of the additional groups of sorted lists. For example, given a threshold x=3, and given an action pattern having a length of two with only two instances found in the action string, that action pattern does not need to be repeated again in the next group (with length of three) because it is already known that there are not at least three instances of it found in the action string. This is easier to describe given another example case as shown below using a string of letters for convenience, although the letters may be used to represent any actions. Table 1 below provides multiple additional groups of sorted lists for action patterns when searching for action patterns that are present at least twice in the string "abacbacca".

TABLE 1

Sorted lists generated for example string and threshold value

| String = 'abacbacca' Group 0 (Unique List) | Threshold Value = 2 Group 1 (Length = 1) | Group 2 (Length = 2) | Group 3 (Length = 3) | Group 4 (Length = 4) |
|---|---|---|---|---|
| a (1, 3, 6, 9) | a (1, 1); (3, 3); (6, 6); (9, 9) | aa (1, 3); (6, 9) | aaa (1, 3, 6) | baca (2, 3, 4, 6) |
| b (2, 5) | b (2, 2); (5, 5) | ab (1, 2); (3, 5) | aab (1, 3, 5) | bacb (2, 3, 4, 5) |
| c (4, 7, 8) | c (4, 4); (7, 7); (8, 8) | ac (1, 4); (6, 7) | aac (1, 3, 4) | bacc (2, 3, 4, 7) |
| | | ba (2, 3); (5, 6) | aba (1, 2, 3) | |
| | | bb (2, 5) | abb (1, 2, 5) | |
| | | bc (2, 4); (5, 7) | abc (1, 2, 4) | |
| | | ca (4, 6); (7, 9) | aca (1, 4, 6) | |
| | | cb (4, 5) | acb (1, 4, 5) | |
| | | cc (4, 7) | acc (1, 4, 7) | |
| | | | baa (2, 3, 6) | |
| | | | bab (2, 3, 5) | |
| | | | bac (2, 3, 4); (5, 6, 7) | |
| | | | bca (2, 4, 6) | |
| | | | bcb (2, 4, 5) | |
| | | | bcc (2, 4, 7) | |
| | | | caa (4, 6, 9) | |
| | | | cab N/A | |
| | | | cac (4, 6, 7) | |

404a was found at location 2. A first subsequence of the first action pattern has been identified at this point. The process then repeats to find additional subsequences by starting where it left off (e.g., with the pointer at location 2). Doing so will find another subsequence with the "letter" action at location 4 and the "opened letter" action at location 8 by using binary searches of both the sorted list for the "letter" action and the sorted list for the "opened letter" action. Once either the end of the action string is reached, or there are no further actions found, the process ends for the given action pattern.

According to some embodiments, up to n additional groups of sorted lists are generated where n=the length of the action string. Furthermore, each group of sorted lists may include all possible action patterns of a given length (from integers 1 up to n). The additional groups of sorted lists may It should be noted that not all locations of a given action pattern need to be identified or stored. In some embodiments, it is sufficient to store only the location of the first action in the action pattern and the last action in the action pattern. For example, the action pattern 'aaa' has actions identified at locations (1, 3, 6), but the action pattern could also be identified by the first and last locations (1, 6).

In the example shown in Table 1, four additional groups of sorted lists have been generated in order to determine all of the possible action patterns that repeat (in a non-overlapping manner) at least two times within the string 'abacbacca'. In one example, the action patterns 'a', 'c', 'aa', 'ab', 'ac', 'ba', 'bc', 'ca.', and 'bac' are returned as an output when requesting all of the action patterns that repeat (in a non-overlapping manner) at least two times. As can be seen in this example, each of the additional groups of sorted lists does not necessarily contain all of the possible action patterns for that group (e.g., of a given length). For example, group 2 does contain all nine possible combinations that use two actions, but group 3 only contains 18 of the 27 total possible combinations that use three actions and group 4 only contains 3 of the 81 total possible combinations that use four actions. The reduced number of sorted lists within certain groups is due to the threshold value since additional sorted lists only need to be made for those action patterns that have at least two occurrences in the string. For example, the action pattern 'cb' was found to have only one occurrence in the string. Thus, when determining the presence of action patterns having three actions, there is no need to determine how many non-overlapping occurrences of cba', 'cbb', and cbc' exist because the previous base sequence of 'cb' only had once occurrence, so it is not possible for any further sequences that start with 'cb' to have more than one occurrence. The same situation is seen in group 4 where only the action patterns 'baca', 'bacb', and 'bacc' are considered because, of the action patterns having length=3, only 'bac' occurred at least two times. This ability to reduce the number of sorted lists created in each group leads to faster response times when making determinations about subsequence frequency within a given string and provides yet another advantage over existing techniques that do not track occurrences of previous subsequence patterns.

Each of the various sorted lists may be created using the techniques described above where the unique action group of sorted lists is consulted to continually update a location pointer for each action. Briefly, the pointer is used to track a position within the action string and is continuously updated after each action of a given action subsequence is found. The current position of the pointer is used when performing a binary search of the sorted list for the next action of the action subsequence to determine if a location of the next action within the action string exists that is after the current pointer position. If so, the process is repeated for the next action of the action subsequence, and if not, no more instances of that particular action subsequence exist in the action string. In some embodiments, a given sorted list from Group n is created by first using the sorted list associated with the base sequence from Group n−1 followed by consulting the unique action group of sorted lists to find the location of the next character in the action pattern. For example, when generating the sorted list for action pattern 'aaa' of Group 3, the previously generated sorted list for the base sequence 'aa' in Group 2 may be consulted first to find the first location of 'aa', which is found at (1,3) in this example. Then, in order to add the 'a' character on the end, the sorted list for 'a' in the group of unique sorted lists is accessed to determine the next instance of 'a' that is after location 3, which in this example is found at location 6. Just as a binary search may be used in the group of unique action sorted lists, a binary search may also be used with determining a next location within the sorted list from the previous group n−1. Leveraging the binary search techniques along with the sorted lists yields a search technique that is a direct improvement over existing techniques due to a reduction of the computational burden of identifying action subsequences within large action strings. The faster runtime can be attributed to both the generation of the sorted lists of actions and the binary searches of the sorted lists to more quickly and efficiently find non-overlapping subsequence patterns across one or more action strings.

According to some embodiments, each additional group of sorted lists may be generated sequentially, such that the sorted lists of Group 1 are created, followed by the sorted lists of Group 2, and so on until completion. In some other embodiments, the various sorted lists are generated in a branching manner starting with each individual character. For example, starting with the character 'a', a sorted list for 'a' is created in Group 1. Since this sorted list does include at least two occurrences, a next sorted list for aa' in Group 2 is created. Since this sorted list also includes at least two occurrences, a next sorted list for 'aaa' is created in Group 3. Since this sorted list does not include at least two occurrences, the next character in Group 3 is attempted and a sorted list for 'aab' is created in Group 3, followed by a sorted list for 'aac'. Once these have been exhausted in Group 3, the methodology returns to Group 2 and tries the next action pattern 'ab'. This branching operation continues until all of the sorted lists have been created.

Figure 10:
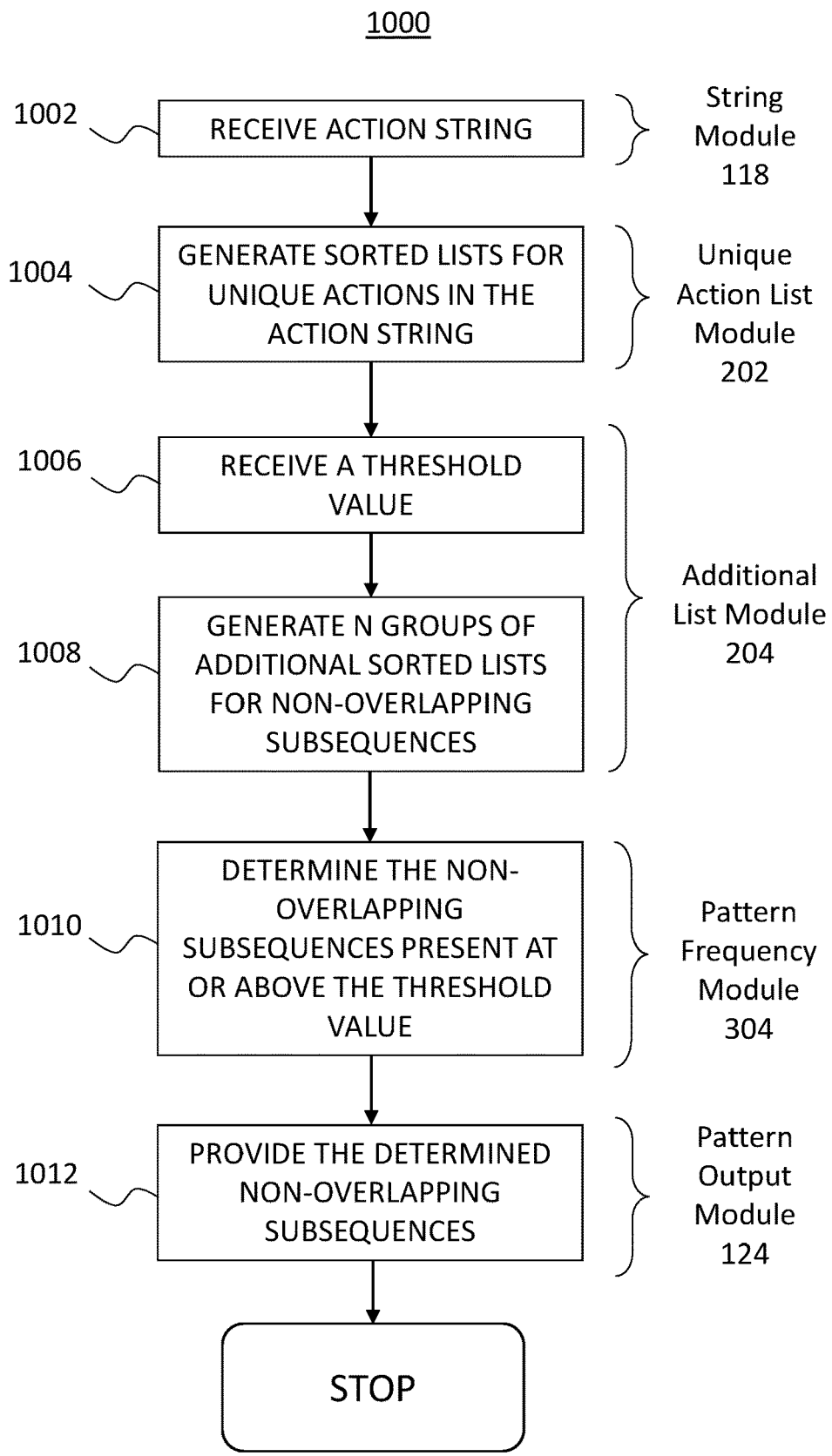
FIG. 10 is a flow diagram of a process for determining frequencies of non-overlapping subsequences in an action string, in accordance with some embodiments of the present disclosure.

FIG. 10 illustrates an example method 1000 of determining the frequency of different action subsequences with a given action string, according to an embodiment. For example, one or more of the operations of method 1000 are shown graphically in FIG. 9. The operations, functions, or actions described in the respective blocks of example method 1000 may be stored as computer-executable instructions in a non-transitory computer-readable medium, such as a memory and/or a data storage of a computing system. As will be further appreciated in light of this disclosure, for this and other processes and methods disclosed herein, the functions performed in method 1000 may be implemented in a differing order. Additionally, or alternatively, two or more operations may be performed at the same time or otherwise in an overlapping contemporaneous fashion.

At block 1002, an action string is received using, for example, string module 118. The action string may be retrieved from a local and/or external memory. In some embodiments, the action string is generated by tracking user actions and building the action string over a period of time by concatenating the actions. Some examples of user actions to include in an action string include clicks from a mouse on certain screen positions, keystrokes on a keyboard, or spoken instructions.

At block 1004, a sorted list for each unique action in the action string is generated using, for example, unique action list module 202, according to an embodiment. Each sorted list is generated by finding each unique action of the action string and identifying all of the locations of that unique action in the action string. According to some embodiments, pointers are used to track the current location within the action string as it is traversed. Once the action string has been fully traversed for a given action, the sorted list for that action has been generated and the process is repeated for another action in order to generate a different sorted list of locations for that next action. The identified locations are listed in order from lowest position to highest position within the action string, according to some embodiments. In some other embodiments, the identified locations are listed in order from highest position to lowest position within the action string. The generation of the sorted lists for unique actions may take place immediately following the creation of the action string. The sorted lists may be stored in memory along with the action string, such that retrieval of the action string also retrieves the associated sorted lists, in accordance with some embodiments. More detailed operations of block 1004 are provided in FIG. 7.

At block 1006, a threshold value is received using, for example, additional list module 204, according to an embodiment. The threshold value may be received from a user via input device 128. The threshold represents a number of times a subsequence is to be repeated within a given action string in order for it to be presented as output. For example, a threshold value of 3 may be used to ask the question "How many and/or what subsequences appear in a given action string at least three times?" Answers to this question may provide insight into repeated actions by a user. In some embodiments, the threshold value is received using pattern frequency module 304.

At block 1008, n groups of additional sorted lists of locations for non-overlapping subsequences of the action string are generated using, for example, additional list module 204, according to an embodiment. The value of n ranges anywhere from 1 up to the total length of the action string. Each group of additional sorted lists includes subsequences of a given length based on the group they are in as illustrated by the example shown in Table 1. Put another way, if there are N total groups of additional sorted lists, each group n of the N total groups includes sorted lists of locations where non-overlapping subsequences having length=n are present within the action string, wherein n is an integer that increases from 1 to N. The additional sorted lists are generated based on the locations of the individual actions from the unique action sorted lists generated in block 1004. A binary search of one or more of the unique action sorted lists may be performed to determine locations of the subsequence actions within the action string. In some embodiments, generation of a given additional sorted list n may also involve a binary search of one or more of the sorted lists found in a previous additional sorted list n−1. More detailed operations of block 1008 are provided in FIG. 11.

At block 1010, the threshold value is used to determine, using for example, pattern frequency module 304, what non-overlapping subsequences are present in the action string a number of times at or above the threshold value, according to an embodiment. The determination may involve a count of the subsequences having a number of instances above the threshold value as indicated by the n groups of additional sorted lists.

At block 1012, the determined non-overlapping subsequences that are present in the action string a number of times at or above the threshold value are provided using, for example, pattern output module 124, according to an embodiment. The determined subsequences may be provided as a message to a user via, for example, output device 126. In some embodiments, the determined one or more subsequences may be provided along with a count of the total number of subsequences found. In some embodiments, the determined one or more subsequences are stored in memory. If no subsequences are identified that are present in the action string a number of times at or above the threshold value, then a message indicating such may be presented to the user and/or stored in memory.

Figure 11:
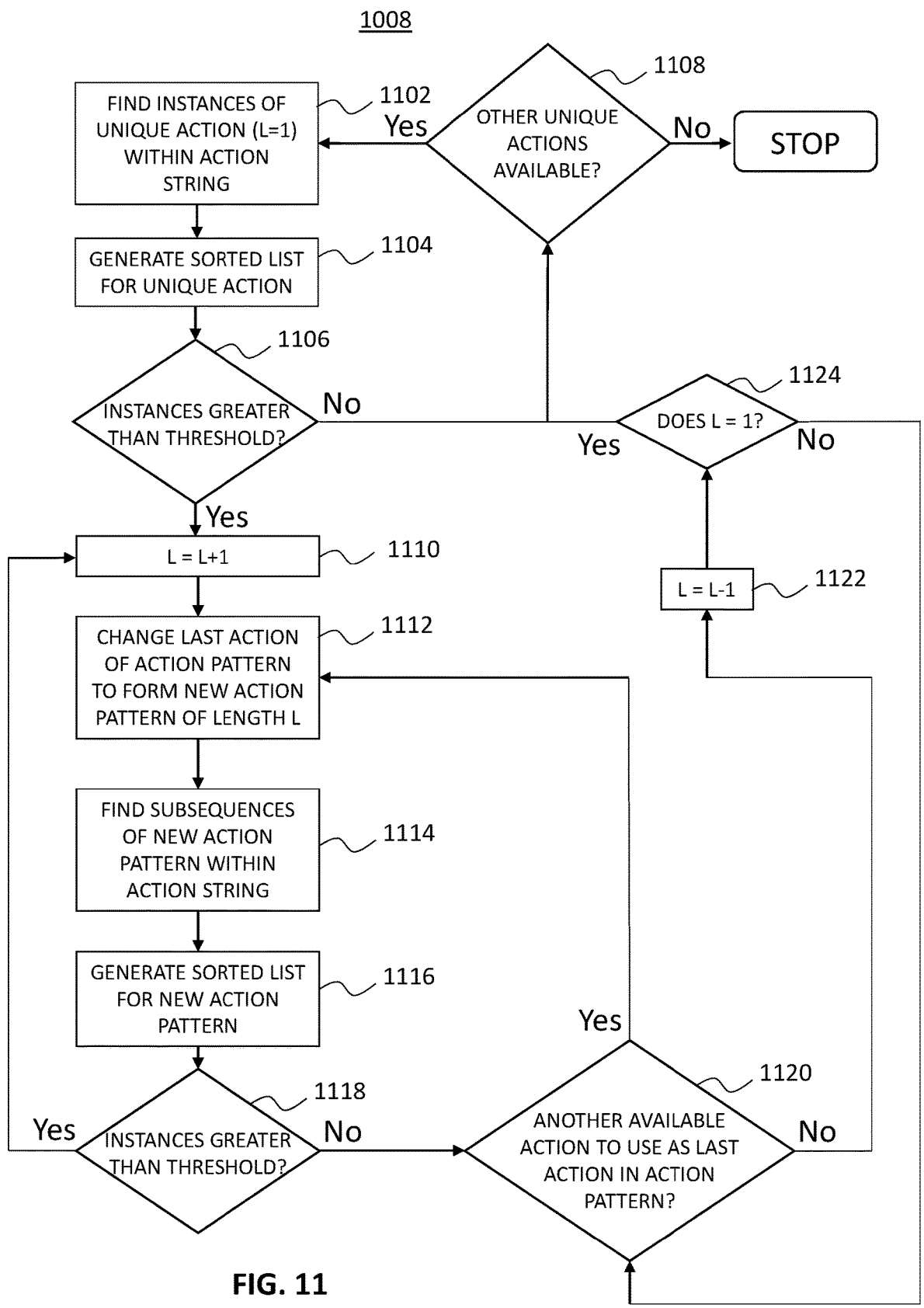
FIG. 11 is a flow diagram of a process for generating groups of sorted lists of non-overlapping subsequences in the action string, in accordance with some embodiments of the present disclosure.

FIG. 11 illustrates an example flowchart providing further operations of block 1008 (also referred to herein as method 1008) from method 1000, according to an embodiment. The operations, functions, or actions described in the respective blocks of example method 1008 may be stored as computer-executable instructions in a non-transitory computer-readable medium, such as a memory and/or a data storage of a computing system. As will be further appreciated in light of this disclosure, for this and other processes and methods disclosed herein, the functions performed in method 1008 may be implemented in a differing order. Additionally, or alternatively, two or more operations may be performed at the same time or otherwise in an overlapping contemporaneous fashion.

Method 1008 begins with block 1102 where instances of a unique action (e.g. subsequence having a length of 1) are found within the action string, according to an embodiment. Each instance of the unique action includes a start position and an end position in the action string (for unique actions, the start and end positions are the same for each instance). Instances of the unique action are found by using the sorted list associated with the unique action to identify each instance.

At block 1104, a sorted list of the found instances for the unique action from block 1102 is generated, according to an embodiment. The sorted list associated with the unique action includes an ordered list of the locations of the unique action within the action string (e.g., from earliest location to latest location in the action string).

At block 1106, a determination is made whether the number of instances in the sorted list generated in block 1104 is greater than or equal to the threshold value. If not, then there is no need to further pursue checking action subsequences that begin with the current unique action and method 1008 proceeds to block 1108. At block 1108, a determination is made whether there any other unique actions available to find within the action string. If not (e.g., all unique actions have already been considered) then method 1008 ends. If there are additional unique actions available, then method 1008 continues back to block 1102 with the next available unique action.

If the number of instances found in block 1102 is greater than or equal to the threshold value, then method 1106 proceeds to block 1110 to continue building action patterns upon the current unique action. At block 1110, the length identifier (L) is increased by one.

At block 1112, a new action pattern of length L is created by changing the last action of the new action pattern to be one of the possible unique actions. For example, if unique action 'a' was found to have more instances than the threshold, then at block 1112, a new action pattern aa' may be created. Further iterations of block 1112 may form a new action pattern 'ab', followed by 'ac', up until all unique actions have been exhausted, as is further explained below.

At block 1114, all non-overlapping subsequences that match the new action pattern created in block 1112 are found within the action string, according to an embodiment. Each found subsequence includes a start position and an end position in the action string. Traversing the action string to find each subsequence may follow a similar progression as explained above in method 608. In some embodiments, each action of the new action pattern is found using the sorted list associated with the action and updating a pointer to keep up with where each action is found within the action string. As noted above, binary searches of the sorted lists may be used to identify a next location in the action string for a given action. Once a subsequence matching the new action pattern has been found, the pointer identifies the location at the end of the found subsequence and the action string is searched again starting from that position for any further subsequences matching the new action pattern. In some embodiments, the sorted list from a previous base action pattern is also used when finding subsequences of the current action pattern. For example, when generating the sorted list for an action pattern 'aaa', the previously generated sorted list for the base action pattern 'aa' is consulted first to find the first location of 'aa'. Then, in order to add the 'a' character on the end, the sorted list for 'a' in the group of unique sorted lists is accessed to determine the next instance of 'a' following the location of 'aa'. Binary searches may be used for both finding a next location of the previous base action pattern in its associated sorted list and also for finding the location of the next unique action in its associated sorted list.

At block 1116, a sorted list of the found subsequences from block 1114 is generated, according to an embodiment. The sorted list associated with the new action pattern includes an ordered list of the start and end locations for each subsequence matching the new action pattern within the action string.

At block 1118, a determination is made whether the number of subsequences in the sorted list generated in block 1116 is greater than or equal to the threshold value. If not, then there is no need to further pursue checking action patterns that begin with the current action pattern and method 1008 proceeds to block 1120. If the number of subsequences in the sorted list generated in block 1116 is greater than or equal to the threshold value, then method 1008 proceeds back to repeat blocks 1110, 1112, 1114, 1116, and 1118.

At block 1120, a determination is made whether there is another available unique action to use as the last action of the action pattern, according to an embodiment. If there is another available action to use, method 1008 proceeds back to block 1112 to form a new action pattern by changing the last action to be the next available unique action. If there are no more available actions to use (e.g., all unique actions have already been used as the last action of the action pattern of length L), then method 1008 proceeds to block 1122 where the length identifier L is reduced by 1. Then, at block 1124, a determination is made whether L=1. If not, then method 1008 returns to block 1120 to check for a next available action using the new shorter action pattern. If L does equal one, then method 1008 returns to block 1108 to check if any other unique actions are available to find within the action string.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

FURTHER EXAMPLE EMBODIMENTS

The following examples pertain to further embodiments, from which numerous permutations and configurations will be apparent.

Example 1 is a method for recognizing an action pattern amongst a plurality of action strings. The method includes receiving, by a string module, a plurality of S action strings, each action strings of the plurality of S action strings comprising a sequence of actions; for one or more action strings s, and for one or more unique actions within a given action string, generating, by a unique action list module, a sorted list of locations of a corresponding unique action within the given action string; receiving, by a pattern count module, an action pattern comprising a sequence of actions; for each of the one or more action strings s, determining, by the pattern count module, if the action pattern is present as a subsequence within the given action string using one or more of the generated sorted lists associated with the given action string; and providing, by a pattern output module, a total number of action strings that include the action pattern.

Example 2 includes the subject matter of Example 1, wherein determining if the action pattern is present as a subsequence within the action string comprises using a binary search of one or more of the generated sorted lists.

Example 3 includes the subject matter of Example 1 or 2, wherein each of the plurality of S action strings is associated with a sequence of actions performed by a different user.

Example 4 includes the subject matter of Example 1 or 2, wherein each of the plurality of S action strings is associated with a sequence of actions performed at a different time by a same user.

Example 5 includes the subject matter of any one of Examples 1-4, wherein one or more of the plurality of action strings comprises a sequence of user actions performed at a website or in a software application.

Example 6 includes the subject matter of any one of Examples 1-5, wherein generating the sorted list of locations comprises sequentially traversing the given action string to identify locations for each of the one or more unique actions.

Example 7 includes the subject matter of any one of Examples 1-6, wherein prior to receiving the plurality of action strings, the method further includes generating one or more of the action strings by concatenating one or more user actions and storing the one or more action strings in a memory, wherein receiving the plurality of action strings comprises retrieving the one or more action strings from the memory.

Example 8 includes the subject matter of any one of Examples 1-7, wherein receiving the action pattern comprises receiving the action pattern via a user interface, and wherein providing the total number of action strings comprises displaying the total number of action strings via a display device.

Example 9 includes the subject matter of any one of Examples 1-8, wherein determining if the action pattern is present as a subsequence within the given action string comprises updating a pointer that identifies a location in the given action string of each successive action within the action pattern.

Example 10 is a system configured to recognize an action pattern amongst a plurality of action strings. The system includes at least one processor, a string module, a unique action list module, a pattern count module, and a pattern output module. The string module is executable by the at least one processor and configured to receive a plurality of S action strings. Each action string s of the plurality of S action strings comprises a sequence of actions. The unique action list module is executable by the at least one processor and configured to, for one or more action strings s, and for one or more unique actions within a given action string, generate a sorted list of locations of a corresponding unique action within the given action string. The pattern count module is executable by the at least one processor and configured to receive an action pattern comprising a sequence of actions, and for each of the one or more action strings s, determine if the action pattern is present as a subsequence within the given action string using one or more of the generated sorted lists associated with the given action string. The pattern output module is executable by the at least one processor and configured to provide a total number of action strings that include the action pattern.

Example 11 includes the subject matter of Example 10, wherein the pattern count module is configured to use a binary search of one or more of the generated sorted lists to determine if the action pattern is present as a subsequence within the action string.

Example 12 includes the subject matter of Example 10 or 11, wherein each of the plurality of S action strings is associated with a sequence of actions performed by a different user.

Example 13 includes the subject matter of Example 10 or 11, wherein each of the plurality of S action strings is associated with a sequence of actions performed at a different time by a user.

Example 14 includes the subject matter of any one of Examples 10-13, wherein one or more of the plurality of action strings comprises a sequence of user actions performed at a website or in a software application.

Example 15 includes the subject matter of any one of Examples 10-14, wherein the unique action list module is configured to sequentially traverse the given action string to identify locations for each of the one or more unique actions.

Example 16 includes the subject matter of any one of Examples 10-15, wherein the string module is further configured to generate one or more of the action strings by concatenating one or more user actions and storing the one or more action strings in a memory, wherein the string module is further configured to receive the plurality of action strings from the memory.

Example 17 includes the subject matter of any one of Examples 10-16, wherein the pattern count module is configured to receive the action pattern via a user interface, and wherein the pattern output module is configured to display the total number of action strings via a display device.

Example 18 includes the subject matter of any one of Examples 10-17, wherein the pattern count module is configured to update a pointer that identifies a location in the given action string of each successive action within the action pattern.

Example 19 is a computer program product that includes one or more non-transitory machine-readable mediums having instructions encoded thereon that when executed by at least one processor cause a process to be carried out for recognizing an action pattern amongst a plurality of action strings. The process includes receiving a plurality of S action strings, each action string s of the plurality of S action strings comprising a sequence of actions; for one or more action strings s, and for one or more unique actions within a given action string, generating a sorted list of locations of a corresponding unique action within the given action string; receiving an action pattern comprising a sequence of actions; for each of the one or more action strings s, determining if the action pattern is present as a subsequence within the action string using one or more of the generated sorted lists associated with the given action string; and providing a total number of action strings that include the action pattern.

Example 20 includes the subject matter of Example 19, wherein determining if the action pattern is present as a subsequence within the action string comprises using a binary search of one or more of the generated sorted lists.

Example 21 includes the subject matter of Example 19 or 20, wherein each of the plurality of S action strings is associated with a sequence of actions performed by a different user.

Example 22 includes the subject matter of Example 19 or 20, wherein each of the plurality of S action strings is associated with a sequence of actions performed at a different time by a user.

Example 23 includes the subject matter of any one of Examples 19-22, wherein one or more of the plurality of action strings comprises a sequence of user actions performed at a website or in a software application.

Example 24 includes the subject matter of any one of Examples 19-23, wherein generating the sorted list of locations comprises sequentially traversing the given action string to identify locations for each of the one or more unique actions.

Example 25 includes the subject matter of any one of Examples 19-24, wherein the process further comprises generating one or more of the action strings by concatenating one or more user actions and storing the one or more action strings in a memory, wherein receiving the plurality of action strings comprises retrieving the one or more action strings from the memory.

Example 26 includes the subject matter of any one of Examples 19-25, wherein receiving the action pattern comprises receiving the action pattern via a user interface, and wherein providing the total number of action strings comprises displaying the total number of action strings via a display device.

Example 27 includes the subject matter of any one of Examples 19-26, wherein determining if the action pattern is present as a subsequence within the given action string comprises updating a pointer that identifies a location in the given action string of each successive action within the action pattern.

Example 28 is a method for recognizing subsequences within an action string. The method includes receiving, by a string module, the action string, wherein the action string comprises a sequence of actions; for each unique action within the action string, generating, by a unique action list module, a sorted list of locations of a corresponding unique action within the action string; using, by an additional list module, at least one of the sorted lists to generate Ngroups of additional sorted lists with each group n of additional sorted lists comprising sorted lists of locations where non-overlapping subsequences having n actions are present within the action string, wherein n is an integer that increases from 1 to N; receiving, by a pattern frequency module, a threshold value; using any of the N groups of additional sorted lists, determining, by the pattern frequency module, the one or more non-overlapping subsequences that are present within the action string a number of times that is at or above the threshold value; and providing, by a pattern output module, the one or more non-overlapping subsequences.

Example 29 includes the subject matter of Example 28, wherein using at least one of the sorted lists to generate N groups of additional sorted lists comprises using a binary search of at least one of the sorted lists Example 30 includes the subject matter of Example 28 or 29, wherein using at least one of the sorted lists to generate N groups of additional sorted lists further comprises using a binary search of one of the additional sorted lists in an n−1 group of additional sorted lists to generate one or more of the additional sorted lists in an $n^{th}$ group of additional sorted lists.

Example 31 includes the subject matter of any one of Examples 28-30, wherein the action string comprises a sequence of user actions performed at a website or in a software application.

Example 32 includes the subject matter of any one of Examples 28-31, wherein generating the sorted list of locations comprises sequentially traversing the action string to identify locations for each of the one or more unique actions.

Example 33 includes the subject matter of any one of Examples 28-32, further comprising generating the action string by concatenating one or more user actions and storing the action string in a memory, wherein receiving the action string comprises retrieving the action string from the memory.

Example 34 includes the subject matter of any one of Examples 28-33, wherein receiving the threshold value comprises receiving the threshold value via a user interface, and wherein providing the one or more non-overlapping subsequences comprises displaying the one or more non-overlapping subsequences via a display device.

Example 35 includes the subject matter of any one of Examples 28-34, wherein using the least one of the sorted lists to generate N groups of additional sorted lists comprises locating instances of each unique action within the action pattern and locating subsequences of generated action patterns within the action string.

Example 36 includes the subject matter of any one of Examples 28-35, wherein the one or more non-overlapping subsequences comprises characters that are contiguous in the action string.

Example 37 is a system that is designed to recognize non-overlapping subsequences within an action string. The system includes at least one processor, a string module, a unique action list module, an additional list module, a pattern frequency module, and a pattern output module. The string module is executable by the at least one processor and configured to receive the action string where the action string comprises a sequence of actions. The unique action list module is executable by the at least one processor and configured to, for each unique action within the action string, generate a sorted list of locations of a corresponding unique action within the action string. The additional list module is executable by the at least one processor and configured to use at least one of the sorted lists to generate N groups of additional sorted lists with each group n of additional sorted lists comprising sorted lists of locations where non-overlapping subsequences having n actions are present within the action string, where n is an integer that increases from 1 to N. The pattern frequency module is executable by the at least one processor and configured to receive a threshold value, and use any of the N groups of additional sorted lists to determine the one or more non-overlapping subsequences that are present within the action string a number of times that is at or above the threshold value. The pattern output module is executable by the at least one processor and configured to provide the one or more non-overlapping subsequences.

Example 38 includes the subject matter of Example 37, wherein the pattern frequency module is configured to use a binary search of at least one of the sorted lists to generate one or more of the N groups of additional sorted lists.

Example 39 includes the subject matter of Example 37 or 38, wherein the pattern frequency module is configured to use a binary search of one of the additional sorted lists in an n−1 group of additional sorted lists to generate one or more of the additional sorted lists in an $n^{th}$ group of additional sorted lists.

Example 40 includes the subject matter of any one of Examples 37-39, wherein the action string comprises a sequence of user actions performed at a website or in a software application.

Example 41 includes the subject matter of any one of Examples 37-40, wherein the unique action list module is configured to sequentially traverse the action string to identify locations for each of the one or more unique actions.

Example 42 includes the subject matter of any one of Examples 37-41, wherein the string module is further configured to generate the action string by concatenating one or more user actions and storing the action string in a memory, wherein the string module is further configured to retrieve the action string from the memory.

Example 43 includes the subject matter of any one of Examples 37-42, wherein the pattern frequency module is configured to receive the threshold value via a user interface and wherein the pattern output module is configured to display the one or more non-overlapping subsequences via a display device.

Example 44 includes the subject matter of any one of Examples 37-43, wherein the additional list module is configured to locate instances of each unique action within the action pattern and locate subsequences of generated action patterns within the action string.

Example 45 includes the subject matter of any one of Examples 37-44, wherein the one or more non-overlapping subsequences comprises characters that are contiguous in the action string.

Example 46 is a computer program product that includes one or more non-transitory machine-readable mediums having instructions encoded thereon that when executed by at least one processor cause a process to be carried out for recognizing non-overlapping subsequences within an action string. The process includes receiving the action string, wherein the action string comprises a sequence of actions; for each unique action within the action string, generating a sorted list of locations of a corresponding unique action within the action string; using at least one of the sorted lists to generate N groups of additional sorted lists with each group n of additional sorted lists comprising sorted lists of locations where non-overlapping subsequences having n actions are present within the action string, wherein n is an integer that increases from 1 to N; receiving a threshold value; using any of the N groups of additional sorted lists, determining the one or more non-overlapping subsequences that are present within the action string a number of times that is at or above the threshold value; and providing the one or more non-overlapping subsequences.

Example 47 includes the subject matter of Example 46, wherein using at least one of the sorted lists to generate N groups of additional sorted lists comprises using a binary search of at least one of the sorted lists.

Example 48 includes the subject matter of Example 46 or 47, wherein using at least one of the sorted lists to generate N groups of additional sorted lists further comprises using a binary search of one of the additional sorted lists in an n−1 group of additional sorted lists to generate one or more of the additional sorted lists in an $n^{th}$ group of additional sorted lists.

Example 49 includes the subject matter of any one of Examples 46-48, wherein the action string comprises a sequence of user actions performed at a website or in a software application.

Example 50 includes the subject matter of any one of Examples 46-49, wherein generating the sorted list of locations comprises sequentially traversing the action string to identify locations for each of the one or more unique actions.

Example 51 includes the subject matter of any one of Examples 46-50, wherein the process further comprises generating the action string by concatenating one or more user actions and storing the action string in a memory, wherein receiving the action string comprises retrieving the action string from the memory.

Example 52 includes the subject matter of any one of Examples 46-51, wherein receiving the threshold value comprises receiving the threshold value via a user interface, and wherein providing the one or more non-overlapping subsequences comprises displaying the one or more non-overlapping subsequences via a display device.

Example 53 includes the subject matter of any one of Examples 46-52, wherein using the least one of the sorted lists to generate N groups of additional sorted lists comprises locating instances of each unique action within the action pattern and locating subsequences of generated action patterns within the action string.

Example 54 includes the subject matter of any one of Examples 46-53, wherein the one or more non-overlapping subsequences comprises characters that are contiguous in the action string.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for recognizing an action pattern amongst a plurality of action strings, the method comprising:
   receiving, by a string module that is executable by at least one processor, a plurality of S action strings, each action string s of the plurality of S action strings comprising a plurality of actions;
   for a given action string s' of the S action strings, the given action string s' consisting of a sequence of n unique actions, identifying locations of each of the n unique actions in the given action string s', wherein each of the n unique actions is performed at a website or in a software application;
   generating n sorted lists, one for each of the n unique actions in the given action string s', wherein a particular one of the n sorted lists comprises a sorted list of locations of a corresponding particular one of the n unique actions within the given action string s';
   receiving, by a pattern count module that is executable by the at least one processor, an action pattern that includes at least a first action and a second action, wherein the first and second actions are included amongst the n unique actions;
   for the given action string s', determining, by the pattern count module, if the action pattern is present as a subsequence within the given action string s', wherein determining if the action pattern is present comprises
      extracting, from one of the generated n sorted lists that is associated with the first action, a first location of the first action in the given action string s',
      setting a pointer location to the first location of the first action, and
      extracting, from one of the n sorted lists that is associated with the second action, a first location of the second action in the given action string s' that is also after the pointer location; and
   providing, by a pattern output module that is executable by the at least one processor, a total number of action strings that include the action pattern.

2. The method of claim 1, wherein each action string s of the plurality of S action strings is performed by a different user.

3. The method of claim 1, wherein each action string s of the plurality of S action strings is performed at a different time by a same user.

4. The method of claim 1, wherein generating the n sorted lists comprises sequentially traversing the given action string s' to identify locations for each of the n unique actions.

5. The method of claim 1, wherein
   prior to receiving the plurality of S action strings, the method further includes generating the given action string s' by concatenating one or more user actions and storing the given action string s' in a memory, and
   receiving the plurality of S action strings comprises retrieving the given action string s' from the memory.

6. The method of claim 1, wherein
   receiving the action pattern comprises receiving the action pattern via a user interface, and
   providing the total number of action strings comprises displaying the total number of action strings via a display device.

7. The method of claim 1, further comprising determining if the action pattern is present as a subsequence within each action string s of the plurality of S action strings.

8. A system configured to recognize an action pattern amongst a plurality of action strings, the system comprising:
   at least one processor;
   a string module, executable by the at least one processor, and configured to receive a plurality of S action strings, each action string s of the plurality of S action strings comprising a plurality of actions;
   a unique action list module, executable by the at least one processor, and configured to
      for a given action string s' of the S action strings, the given action string s' consisting of a sequence of n unique actions, identifying locations of each of the n unique actions in the given action string s', wherein each of the n unique actions is performed at a website or in a software application, and
      generate n sorted lists, one for each of the n unique actions in the given action string s', wherein a particular one of the n sorted lists comprises a sorted list of locations of a corresponding particular one of the n unique actions within the given action string s';
   a pattern count module, executable by the at least one processor, and configured to
      receive an action pattern that includes at least a first action and a second action, wherein the first and second actions are included amongst the n unique actions, and
      extracting, from one of the generated n sorted lists that is associated with the first action, a first location of the first action in the given action string s',
      setting a pointer location to the first location of the first action, and
      extracting, from one of the n sorted lists that is associated with the second action, a first location of the second action in the given action string s' that is also after the pointer location; and
   a pattern output module, executable by the at least one processor, and configured to provide a total number of action strings that include the action pattern.

9. The system of claim 8, wherein the pattern count module is configured to provide the total number of action strings that include the action pattern from amongst the plurality of S action strings.

10. The system of claim 8, wherein each action string s of the plurality of S action strings is performed by a different user.

11. The system of claim 8, wherein each action string s of the plurality of S action strings is performed at a different time by a user.

12. The system of claim 8, wherein the unique action list module is configured to sequentially traverse the given action string s' to identify locations for each of the n unique actions.

13. The system of claim 8, wherein the string module is further configured to
generate the given action string s' by concatenating one or more user actions and storing the given action string s' in a memory, and
receive the plurality of S action strings from the memory.

14. The system of claim 8, wherein the pattern count module is configured to receive the action pattern via a user interface, and wherein the pattern output module is configured to display the total number of action strings via a display device.

15. The system of claim 8, wherein the pattern count module is configured to determine if the action pattern is present as a subsequence within each action string s of the plurality of S action strings.

16. A computer program product including one or more non-transitory machine-readable mediums having instructions encoded thereon that when executed by at least one processor cause a process to be carried out for recognizing an action pattern amongst a plurality of S action strings, the process comprising:
receiving, by the at least one processor, the plurality of S action strings, each action string s of the plurality of S action strings comprising a plurality of actions;
for a given action string s' of the S action strings, the given action string s' consisting of a sequence of n unique actions, identifying locations of each of the n unique actions in the given action string s', wherein each of the n unique actions is performed at a website or in a software application;
generating, by the at least one processor, n sorted lists, one for each of the n unique actions in the given action string s', wherein a particular one of the n sorted lists comprises a sorted list of locations of a corresponding particular one of the n unique actions within the given action string s';
receiving, by the at least one processor, an action pattern that includes at least a first action and a second action, wherein the first and second actions are included amongst the n unique actions;
for the given action string s', determining, by the at least one processor, if the action pattern is present as a subsequence within the given action string s', wherein determining if the action pattern is present comprises
extracting, from one of the generated n sorted lists that is associated with the first action, a first location of the first action in the given action string s',
setting a pointer location to the first location of the first action, and
extracting, from one of the n sorted lists that is associated with the second action, a first location of the second action in the given action string s' that is also after the pointer location; and
providing, by the at least one processor, a total number of action strings that include the action pattern.

17. The computer program product of claim 16, wherein each action string s of the plurality of S action strings is performed by a different user.

18. The computer program product of claim 16, wherein each action string s of the plurality of S action strings is performed at a different time by a user.

19. The computer program product of claim 16, wherein generating the n sorted lists comprises sequentially traversing the given action string s' to identify locations for each of the n unique actions.

20. The computer program product of claim 16, wherein the process further comprises generating the given action string s' by concatenating one or more user actions and storing the given action string s' in a memory, and
receiving the plurality of S action strings comprises retrieving the given action string s' from the memory.

21. The computer program product of claim 16, wherein receiving the action pattern comprises receiving the action pattern via a user interface, and
providing the total number of action strings comprises displaying the total number of action strings via a display device.

22. The computer program product of claim 16, further comprising determining if the action pattern is present as a subsequence within each action string s of the plurality of S action strings.

23. A method for recognizing subsequences within an action string, the method comprising:
receiving, by a string module that is executable by at least one processor, the action string, wherein the action string comprises a sequence of m unique actions, wherein each of the m unique actions is performed at a website or in a software application;
identifying locations of each of the m unique actions in the action string;
generating, by a unique action list module that is executable by the at least one processor, m sorted lists, one for each of the m unique actions in the action string, wherein a particular one of the m sorted lists comprises a sorted list of locations of a corresponding particular one of the m unique actions within the action string;
using, by an additional list module that is executable by the at least one processor, at least one of the m sorted lists to generate N groups of action subsequences, an nth one of the N groups having subsequences of n actions, wherein n is an integer that increments from 1 to N;
generating, for a particular one of the action subsequences that comprises a first action and a second action, a list of locations in the action string for each of the first and second actions, wherein generating the list of locations comprises
extracting, from one of the m sorted lists, a first location of the first action in the particular action subsequence,
setting a pointer location to the first location of the first action, and
extracting, from one of the m sorted lists, a first location of the second action in the particular action subsequence that is also after the pointer location;
receiving, by a pattern frequency module that is executable by the at least one processor, a threshold value;
using any of the N groups of action subsequences, determining, by the pattern frequency module, action subsequences that are present within the action string a number of times that is at or above the threshold value; and providing, by a pattern output module that is executable by the at least one processor, the action subsequences that are present within the action string the number of times that is at or above the threshold value.

24. The method of claim 23, wherein generating the m sorted lists comprises sequentially traversing the action string to identify locations for each of the m unique actions.

25. The method of claim 23, wherein:
the action string is one of a plurality of action strings received by the string module; and
each action string of the plurality of action strings is performed by a different user.

26. The method of claim 23, wherein:
the action string is one of a plurality of action strings received by the string module; and
each action string of the plurality of action strings is performed at a different time by a same user.

27. The method of claim 23, further comprising generating the action string by concatenating one or more user actions and storing the action string in a memory, wherein receiving the action string comprises retrieving the action string from the memory.

28. The method of claim 23, wherein:
the action string is one of a plurality of action strings received by the string module; and
the method further comprises receiving an action pattern that includes at least the first action and the second action; and
the method further comprises determining a total number of the plurality of action strings that includes the action pattern.

* * * * *